(12) United States Patent
Yanamandra et al.

(10) Patent No.: US 12,499,121 B2
(45) Date of Patent: Dec. 16, 2025

(54) REAL-TIME MONITORING AND REPORTING SYSTEMS AND METHODS FOR INFORMATION ACCESS PLATFORM

(71) Applicant: Open Text SA ULC, Halifax (CA)

(72) Inventors: Sangeetha Yanamandra, Hyderabad (IN); Ravinder Reddy Yeddla, SangaReddy (IN)

(73) Assignee: OPEN TEXT SA ULC, Halifax (CA)

( * ) Notice: Subject to any disclaimer, the term of this patent is extended or adjusted under 35 U.S.C. 154(b) by 0 days.

(21) Appl. No.: 18/525,438

(22) Filed: Nov. 30, 2023

(65) Prior Publication Data

US 2024/0104147 A1 Mar. 28, 2024

Related U.S. Application Data

(63) Continuation of application No. 16/162,092, filed on Oct. 16, 2018, now Pat. No. 11,880,418.

(51) Int. Cl.
*G06F 16/25* (2019.01)
*G06F 16/27* (2019.01)
(Continued)

(52) U.S. Cl.
CPC ........ *G06F 16/254* (2019.01); *G06F 16/9027* (2019.01); *G06F 16/90335* (2019.01);
(Continued)

(58) Field of Classification Search
CPC ............... G06F 16/951; G06F 16/9027; G06F 16/90335; G06F 16/9038; G06F 16/27; G06F 16/254; H04L 43/08; H04L 43/10; H04L 41/5064; H04L 43/045; H04L 43/0817

See application file for complete search history.

(56) References Cited

U.S. PATENT DOCUMENTS 6,199,081 B1 *  3/2001  Meyerzon ............. G06F 40/117
                                                715/256
2005/0022199 A1 * 1/2005  Davis ..................... G06F 9/542
                                                718/102
(Continued)

*Primary Examiner* — Ann J Lo
*Assistant Examiner* — Fernando M Mari Valcarcel
(74) *Attorney, Agent, or Firm* — Sprinkle IP Law Group

(57) ABSTRACT

A new ecosystem monitoring solution provides novel features including a dashboard service, a dashboard notifier, and a near real time query processor. The dashboard service can continuously aggregate, through the dashboard notifier and optionally dashboard agents, metadata from disparate ecosystem components of a complex computing platform or ecosystem. The metadata include metrics of crawling, data ingestion, and content enrichment activities and health information of the disparate ecosystem components. The metrics are processed with respect to a time window utilizing an expression tree dynamically constructed by the query processor. The query processor can navigate the expression tree to form collection models. Each collection has aggregation functions for aggregating a set of metrics specified in a view model. Responsive to a view request, the view model can be dynamically updated utilizing the collection model and communicated to a user device for rendition and presentation of a view through a dashboard user interface.

19 Claims, 18 Drawing Sheets

(51) Int. Cl.
*G06F 16/901* (2019.01)
*G06F 16/903* (2019.01)
*G06F 16/9038* (2019.01)
*G06F 16/951* (2019.01)

(52) U.S. Cl.
CPC ........ *G06F 16/9038* (2019.01); *G06F 16/951* (2019.01); *G06F 16/27* (2019.01)

(56) References Cited

U.S. PATENT DOCUMENTS

| | | | |
|---|---|---|---|
| 2006/0020942 A1* | 1/2006 | Ly | G06F 9/5027 718/100 |
| 2011/0258630 A1* | 10/2011 | Fee | G06F 9/4843 718/101 |
| 2015/0281453 A1* | 10/2015 | Maturana | G06F 9/5072 379/265.12 |
| 2016/0071135 A1* | 3/2016 | Seifert | G06Q 30/0204 707/602 |
| 2016/0306857 A1* | 10/2016 | Barsness | G06F 16/9024 |
| 2017/0142200 A1* | 5/2017 | Kodner | H04W 4/21 |
| 2017/0154080 A1* | 6/2017 | De Smet | G06F 16/254 |
| 2018/0089328 A1* | 3/2018 | Bath | G06F 16/9538 |
| 2018/0260913 A1* | 9/2018 | Garti | G06Q 50/01 |

\* cited by examiner

Activity Information

Scope: Last Hour

Time — 501
- ● Last Hour
- ○ Last 24 Hours
- ○ Last 7 Days

Group — 505
[Choose a filter ...] Clear Filters

Job — 510
[5  ✕] Clear Filters wsm-crawler ( 2 components )

| ▸ Extend Infos | | Jobs | | | Documents |
|---|---|---|---|---|---|
| Info | | Running | Completed | Failed | Crawled |
| ▸ Twitter crawler service - 1 ← 552 | | 0 | 1 | 0 | 48103 |
| Host: | | | | | |
| ▸ Web crawler service - 1 ← 554 | | 0 | 0 | 0 | 0 |
| Host: | | | | | |
| Total | | 0 | 1 | 0 | 48103 | ecm-crawler ( 1 components )

| ▸ Extend Infos | | Jobs | | | Documents |
|---|---|---|---|---|---|
| Info | | Running | Completed | Failed | Crawled |
| ▸ Ecm crawler service - 1 ← 556 | | 0 | 0 | 0 | 0 |
| Host: | | | | | |
| Total | | 0 | 0 | 0 | 0 | pipeline ( 1 components )

| ▸ Extend Infos | Documents | | | |
|---|---|---|---|---|
| Info | Submitted | Processed | Enriched | Persisted |
| ▸ Ingestion pipeline - 1 ← 558 | 15291 | 30722 | 15045 | 30722 |
| Host: | | | | |
| Total | 15291 | 30722 | 15045 | 30722 |

| Activity Information | | | | |
|---|---|---|---|---|
| Scope: Last Hour | | | | | wsm-crawler ( 2 components )

| ▶ Extend Infos | Jobs | | | Documents |
|---|---|---|---|---|
| Info | Running | Completed | Failed | Crawled |
| ▶ Twitter crawler service - 1 ←552 | 1 | 2 | 0 | 44687 |
| Host: | | | | |
| ▶ Web crawler service - 1 ←554 | 0 | 0 | 0 | 0 |
| Host: | | | | |
| Total | 1 | 2 | 0 | 44687 | ecm-crawler ( 1 components )

| ▶ Extend Infos | Jobs | | | Documents |
|---|---|---|---|---|
| Info | Running | Completed | Failed | Crawled |
| ▶ Ecm crawler service - 1 ←556 | 1 | 0 | 0 | 196 |
| Host: | | | | |
| Total | 1 | 0 | 0 | 196 | pipeline ( 1 components )

| ▶ Extend Infos | Documents | | | |
|---|---|---|---|---|
| Info | Submitted | Processed | Enriched | Persisted |
| ▶ Ingestion pipeline - 1 ←558 | 15467 | 30976 | 15202 | 30779 |
| Host: | | | | |
| Total | 15467 | 30976 | 15202 | 30779 |

Time ~501
- ● Last Hour
- ○ Last 24 Hours
- ○ Last 7 Days

Group ~505

Choose a filter ...
- ECMCrawler_12315
- ECMCrawler_12351
- ECMCrawler_12381
- ECMCrawler_12311
- ECMCrawler_12322
- web
- ECMCrawler_12321
- ECMCrawler_12312
- searchjobs
- twitter
- defaultJobGroupName ~507

This console allows you to create, configure, run and manage crawling jobs in order to extract information from different social media and web sources. Click on an existing job name to view that job's details. New jobs can be created using the button below.

+ New Crawling Job

Search Job [ × ] [🔍]      Showing 1 to 10 of 18 entries    Show [10 ▼] Entries

Job Group

Choose a Group
Clear filters

Status
- ☐ Running
- ☐ Completed
- ☐ Waiting
- ☐ Failed
- ☐ Aborted
- ☐ Scheduled
- ☐ Unscheduled Clear filters

Job Type
- ☐ Search
- ☐ Stream
- ☐ Web

Clear filters

| Job ID ⇕ | Name | Group | Type | Status | Actions |
|---|---|---|---|---|---|
| 1 | search-1 | searchjobs | Twitter Search | Completed | ⚙ Actions ▼ |
| 2 | web-1 | web | Web | Failed | ⚙ Actions ▼ |
| 3 | Stream-1 | stream-1 | Twitter Stream | Aborted | ⚙ Actions ▼ |
| 4 | NewCrawlerjob_Temp | twitter | Twitter Search | Completed | ⚙ Actions ▼ |
| 5 | temptwitter_stream | twitter | Twitter Stream | Aborted | ▷ Start  ☐ Stop  🗑 Delete  ✎ Edit  ⧉ Clone |
| 6 | NewwebSearch | web | Web | Failed | |
| 7 | stream-tending | stream-1 | Twitter Stream | Aborted | ⚙ Actions ▼ |
| 8 | Copy of NewCrawlerjob_Temp | twitter | Twitter Search | Completed | ⚙ Actions ▼ |
| 9 | test | twitter | Twitter Search | Completed | |
| 11 | pipeline search | searchjobs | Twitter Search | Completed | ⚙ Actions ▼ |

REAL-TIME MONITORING AND REPORTING SYSTEMS AND METHODS FOR INFORMATION ACCESS PLATFORM

RELATED APPLICATION(S)

This application is a continuation of, and claims a benefit of priority under 35 U.S.C. 120 of, U.S. patent application Ser. No. 16/162,092, filed Oct. 16, 2018, issued as U.S. Pat. No. 11,880,418, entitled "REAL-TIME MONITORING AND REPORTING SYSTEMS AND METHODS FOR INFORMATION ACCESS PLATFORM," which is hereby incorporated herein for all purposes.

TECHNICAL FIELD

This disclosure relates generally to monitoring networked computers. More particularly, this disclosure relates to systems, methods, and computer program products for real-time monitoring and reporting of metrics from disparate components of an ecosystem, useful for monitoring an information access platform, an artificial intelligence and analytics platform, or any complex computing platform with disparate components.

BACKGROUND OF THE RELATED ART

Today's enterprises are continuously bombarded with massive amounts of data (e.g., unstructured digital content) from disparate sources. In many scenarios, enterprises need reliable and timely real-time responses and data solutions to make sense and make use of such content.

Unfortunately, enterprises are often poorly equipped to manage massive silos of unstructured information, which can create unmitigated risk and adversely affect productivity and agility. To this end, an enterprise-class information access platform can federate information across all sources and reduce the complexity in managing and using huge amounts of different types of data.

INFOFUSION, available from OpenText™, headquartered in Waterloo, Canada, is an example of an information access platform. INFOFUSION represents a new approach to managing, analyzing and understanding unstructured information and helps enterprises discover, analyze, and act on their content to improve performance and agility, while significantly reducing the cost and complexity of individual systems and content sources. With this new approach, various one-off information applications and their associated indexes, connectors, hardware, and support can be replaced with an information ecosystem (which, for the sake of brevity, is referred to herein as an "ecosystem") having disparate components that can be managed by way of a common information management platform that provides, for instance, integrated services that utilize a common data model, a unified index, and an extensible connector framework, etc.

As an example, the ecosystem can include discrete components (referred to herein as ecosystem components) that run on the common information management platform. These ecosystem components can be particularly configured for data integration, content migration, and data archiving.

Data integration allows an enterprise to rapidly ingest and utilize data from disparate sources such as social media, mobile applications, the cloud/World Wide Web (web), and enterprise systems (e.g., enterprise content management (ECM) systems, Enterprise Resource Planning (ERP) systems, Customer Relationship Management (CRM) systems, etc.). During data integration, ingested content may be enriched by way of performing content analytics. Content analytics enables an enterprise to gain insight and provide visibility into the amount of content that is being created/ingested, the nature of that content, and how it is used, for instance, in an enterprise computing environment. It also enables the creation of machine-readable content from unstructured content, extraction of meaningful and/or relevant content from the unstructured content, and discovery of valuable factual information from the unstructured content. By significantly reducing the time required to identify what content should be kept, content analytics can increase productivity and reduce legal risk (e.g., for compliance reasons). Content migration enables an end-to-end migration of content from one or many disparate repositories to any new destination in today's global network environment while delivering content integrity to improve operational efficiency and reduce cost and risk. Data archiving unifies information silos that cross application boundaries, consolidating and transforming data and content throughout the entire ecosystem, including leading-edge ERP, CRM, and ECM systems as well as legacy applications.

These operations necessitate various data flows across the disparate ecosystem components. However, while existing computer system monitoring tools such as Graphite (which is a free open-source software tool) can collect, store, and display numeric time-series data on the performance of computer systems, they lack the abilities to monitor or report data flows from applications, provide operation intelligence, and monitor specific process (e.g., jobs) within individual computer systems. Consequently, there is room for innovations and improvements in monitoring a complex computing platform or ecosystem having disparate components.

SUMMARY OF THE DISCLOSURE

Embodiments disclosed herein provide a new and inventive real-time ecosystem monitoring solution that can address the above-described needs and provide technical benefits and advantages. This solution can combine user-configurable view modeling, streaming, and reporting. Embodiments disclosed herein can be particularly useful for monitoring a complex computing platform or ecosystem with disparate components.

In some embodiments, a dashboard monitoring system may run on a server machine operating in an enterprise computing environment. The dashboard monitoring system can continuously aggregate tuples from disparate ecosystem components of an ecosystem. The tuples contain metadata about the disparate ecosystem components of an ecosystem and include metrics of crawling, data ingestion, and content enrichment activities and health information of the disparate ecosystem components of the ecosystem.

In some embodiments, the dashboard monitoring system can process the metrics from the disparate ecosystem components of the ecosystem into collection models with respect to a time window. This processing can include dynamically constructing an expression tree to derive the functions of the collection models. A collection model can correspond to one or more view models for aggregating metrics specified in the view model(s). Each view model can have an associated filter definition that can be used to generate different views based on the same view model and/or collection model.

In some embodiments, the dashboard monitoring system can dynamically generate and/or update multiple view models in real time or near real time utilizing the collection models. Each view model of the view models can be configured for a view of particular metrics from a group of ecosystem components of the ecosystem. In some embodiments, the dashboard monitoring system can communicate the view models to the dashboard user interfaces on user devices communicatively connected to the dashboard monitoring system. The dashboard user interfaces on the user devices, in turn, can utilize the view models to render and display dynamic, real time views of the activities and health information of the disparate ecosystem components in the ecosystem on the user devices.

In some embodiments, the dashboard monitoring system can receive the metrics that are pushed from or published by dashboard notifiers running in the disparate ecosystem components of the ecosystem or a portion thereof. In some embodiments, the dashboard monitoring system can poll the metrics through optional dashboard agents installed on ecosystem nodes and communicatively connected to the disparate ecosystem components of the ecosystem or a portion thereof.

In some embodiments, a method of ecosystem monitoring may include configuring an ecosystem component with a dashboard notifier library, the dashboard notifier library including an in-memory data structure configured for asynchronous processing. The method may further include starting up the ecosystem component configured with the dashboard notifier library. This starts up the dashboard notifier embedded in the ecosystem component and the dashboard notifier registers the ecosystem component with the dashboard monitoring system. The method may further include the dashboard notifier placing elements from the ecosystem component in the in-memory data structure and asynchronously reading a batch of elements from the in-memory data structure and pushing or publishing the batch of elements to the dashboard monitoring system.

In some embodiments, the ecosystem monitoring solution disclosed herein further includes a new near real time query processor (which, for the sake of brevity, is referred to herein as a "query processor"). In some embodiments, the query processor may process continuous input streams of tuples pushed or polled from disparate ecosystem components of an ecosystem and dynamically construct an expression tree in memory.

The expression tree can be a Boolean expression tree having nodes representing predicates extracted, derived, or otherwise determined from a view model or a view request. The query processor can navigate the predicates to form a set of aggregation functions for each collection model.

The query processor can receive a view request from a user device through a user interface. The view request can indicate a time window and a set of metrics of crawling, data ingestion, and content enrichment activity and health information of the disparate system components of the ecosystem. In response, the query processor can determine an initiate state of the set of metrics in the time window and filter, utilizing the expression tree, the input streams of tuples pushed or polled from the disparate ecosystem components of the ecosystem into a collection model that corresponds or mapped to a view model specifying a view for the set of metrics of crawling, data ingestion, and content enrichment activity and health information of the disparate system components of the ecosystem. In this way, the view model can be "refreshed" or updated with the metric values of the set of metrics utilizing the collection model. The updated view model can then be communicated to the user device for rendition and presentation of the view through the user interface.

The query processor can process multiple view requests received through multiple user sessions (which can take place between the dashboard monitoring system and one or more user devices) simultaneously and update views displayed on the user(s) in real time or near real time. In this way, the dashboard monitoring system can continuously reflect the real time job activities and health information of all the ecosystem components in the ecosystem with respect to different changing time windows across multiple user sessions.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 5A depicts a diagrammatic representation of an example of a dashboard user interface according to some embodiments.

FIG. 5B shows that the dashboard user interface shown in FIG. 5A can present information using a job group filter without needing to change the view models according to some embodiments.

FIG. 6 depicts a diagrammatic representation of an example of a job group configuration console according to some embodiments.

FIG. 7 depicts a diagrammatic representation of an example of a job management console according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
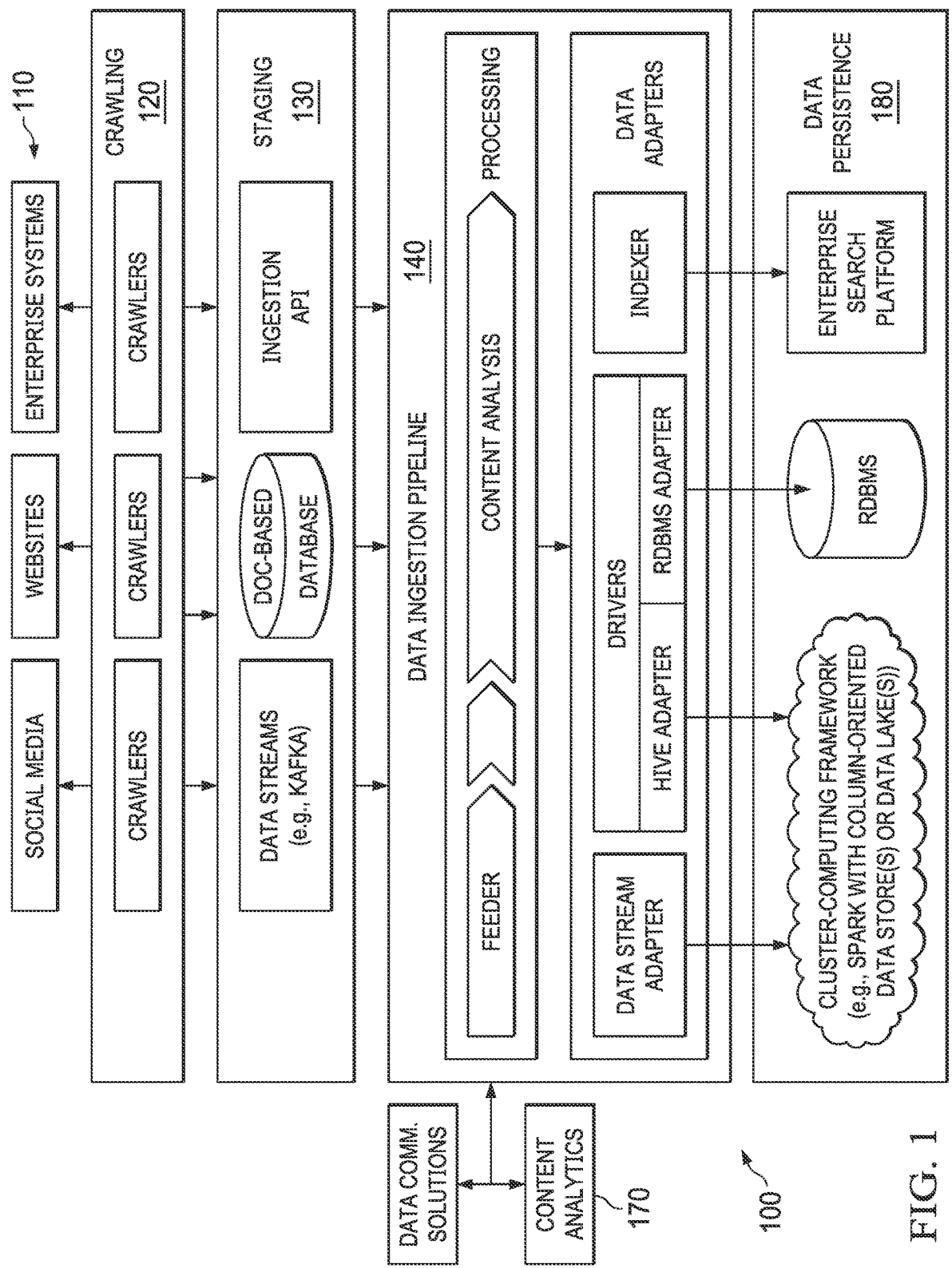
FIG. 1 depicts a diagrammatic representation of a non-limiting example of an ecosystem with disparate ecosystem components configured for a variety of functions.

FIG. 1 depicts a diagrammatic representation of ecosystem 100 with disparate ecosystem components (referred to herein as "ecosystem components"). The disparate ecosystem components are configured with various discrete functions, for instance, crawling, data ingestion, content enrichment, and data persistence (e.g., data archiving).

In this disclosure, an "ecosystem component" refers to a source component which is intended to publish metrics and events to a dashboard service of a dashboard monitoring system disclosed herein. A "dashboard service" refers to the actual service provided by the dashboard monitoring system to process the metrics and events. A "metric" can be anything that contains a numerical measurement of health or activity of an ecosystem component. An "event" can refer to any arbitrary change in the state of an ecosystem component.

Ecosystem 100 provides an example of a complex computing platform for which embodiments of a dashboard monitoring system disclosed herein can be particularly useful. In this disclosure, a computing platform refers to the computing environment in which certain computer programs can run and includes the hardware (e.g., a computer architecture) and software (e.g., an operating system) necessary to run such computer programs. A complex computing platform generally refers to a computing platform with multifaceted operations performed by multiple powerful computer systems such as enterprise systems. There are many types of enterprise systems. Generally, enterprise systems refer to large-scale applications that can support business processes, information flows, data analytics, reporting, etc. in complex organizations.

In the example of FIG. 1, ecosystem 100 can be characterized as an information access platform. Another example of a complex computing platform can be an artificial intelligence (AI) powered analytics platform with advanced content analytics and data ingestion such as MAGELLAN, which is also available from Open Text. Embodiments of a dashboard monitoring system disclosed herein can be particularly useful for many types of complex computing platforms and are not limited to an information access platform or an AI powered analytics platform.

To monitor such a complex computing platform, scalability can be an issue. For example, many ecosystem components of ecosystem 100 can scale horizontally, making it difficult to monitor all the activities taking place in ecosystem 100 in real time. Further complicating the matter is the extensibility and configurability of these ecosystem components.

For example, as shown in FIG. 1, crawling layer 120 has a variety of crawlers configured for crawling disparate input sources 110. For instance, independently and separately, a social media crawler may be configured for crawling a social media application, a web crawler may be configured for crawling web sites on the Internet, and a data crawler may be configured for crawling an enterprise system in an enterprise computing environment. The numbers of input sources and crawlers are extensible, and their outputs are configurable.

As another example, data ingestion pipeline 140 has a sequence (or chain) of processors configured for ingesting unstructured and semi-structured information (e.g., TWEETS, posts, messages, MICROSOFT Word, EXCEL, and PDF documents, etc.) that various crawlers at crawling layer 120 have crawled from various input sources 110 (e.g., social media, web sites, enterprise systems, etc.). Data ingestion pipeline 140 can retrieve the crawled raw information from staging area 130 and call the processors to process the crawled raw information in a pipelined fashion. For instance, data ingestion pipeline 140 may call content analytics module 170 to analyze the content of a document that is going through data ingestion pipeline 140. Content analytics module 170 may analyze the content of a document and extract, derive, or otherwise interpret metadata from the document. The metadata generated by content analytics module 170 can be associated with the document (e.g., stored as attributes of the document). The additional metadata can enrich the document before the document exits data ingestion pipeline 140. Other processes may also be applied by data ingestion pipeline 140. This process is referred to as data ingestion. This data ingestion process produces ingested content that can then be provided, through appropriate data adapters, to data persistence layer 180 in the enterprise computing environment.

There can be multiple computing facilities in data persistence layer 180. Examples of computing facilities can include a cluster-computing framework such as Apache SPARK, a repository such as a relational database management system, an enterprise search platform such as Apache SOLR, etc. Various data adapters can be utilized by data ingestion pipeline 140 to communicate with computing facilities in data persistence layer 180. As a non-limiting example, a data stream adapter such as an Apache KAFKA adapter can be utilized by data ingestion pipeline 140 to stream ingested content to a data lake (which can be part of a cluster-computing framework). A data lake refers to a system or repository of data stored in its natural format, usually object blobs or files. A data lake can be a single store of all enterprise data, including raw copies of source system data and transformed data used for various tasks such as reporting, visualization, analytics, and machine learning. Metadata can be stored in the data lakes and be consumed by other data models or systems.

Data ingestion pipeline 140 may also communicate with other ecosystem components in different ways. For instance, data ingestion pipeline 140 may provide ingested content to content analytics module 170 for further analysis through an application programming interface (API) call. Content analytics module 170 may implement a multilingual advanced search and analytics platform with a powerful API that allows data ingestion pipeline 140 and other ecosystem components to call content analytics module 170 to perform, for instance, concept extraction, entity extraction, categorization, sentiment analysis, summarization, similarity service, language detection, etc. Content analytics module 170 is configurable through a management console through which administrators and knowledge workers can use to modify and maintain controlled vocabulary in a flexible and simple manner with no programming expertise required.

The processors in data ingestion pipeline 140 are also configurable. Further, the number of computing facilities downstream from data ingestion pipeline 140 is extensible. Accordingly, at any given time, a significant number of data ingestion pipeline jobs can be running in data ingestion pipeline 140 and the number of information flows can also be significant.

Different ecosystem components have different jobs and perform different activities in ecosystem 100. Accordingly, output data (which can include activity-related information and health-related information) from these ecosystem components can be very different. For example, a TWITTER crawler may report metrics concerning its health status (e.g., "running," "completed," or "failed") and how many TWEETS it has crawled from a TWITTER server. By contrast, a data ingestion pipeline component may report metrics indicating how many documents it has "submitted," "processed," "enriched," and/or "persisted." Accordingly, different ecosystem components can have very different metrics. Considering that the number and kinds of ecosystem components are extensible and configurable, and that each ecosystem component can scale horizontally, monitoring all their health- and activity-related metrics in real time or near real time can be an extremely difficult, daunting task.

Figure 2:
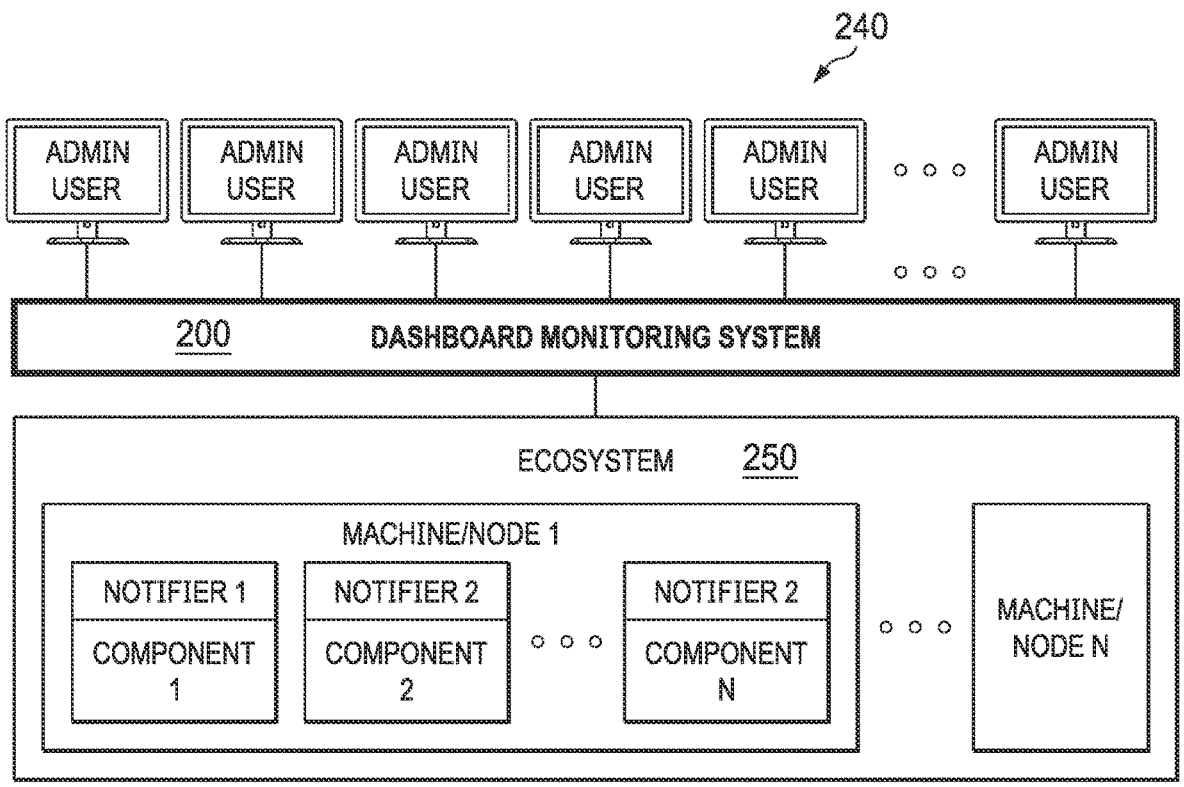
FIG. 2 depicts a diagrammatic representation of an example of a dashboard monitoring system configured for monitoring an ecosystem with disparate ecosystem components and providing a dashboard service for viewing the activity and health information of the disparate ecosystem components on user devices.

To this end, FIG. 2 depicts a diagrammatic representation of an example of dashboard monitoring system 200 configured for continuously monitoring an ecosystem (e.g., ecosystem 100). As illustrated in FIG. 2, dashboard monitoring system 200 can reside between, and communicatively connected to ecosystem 250 and user devices 240 over network connections. Dashboard monitoring system 200 may run on a server machine operating in an enterprise computing environment. Ecosystem 250 and/or user devices 240 may operate in or outside of the enterprise computing environment.

Figure 3:
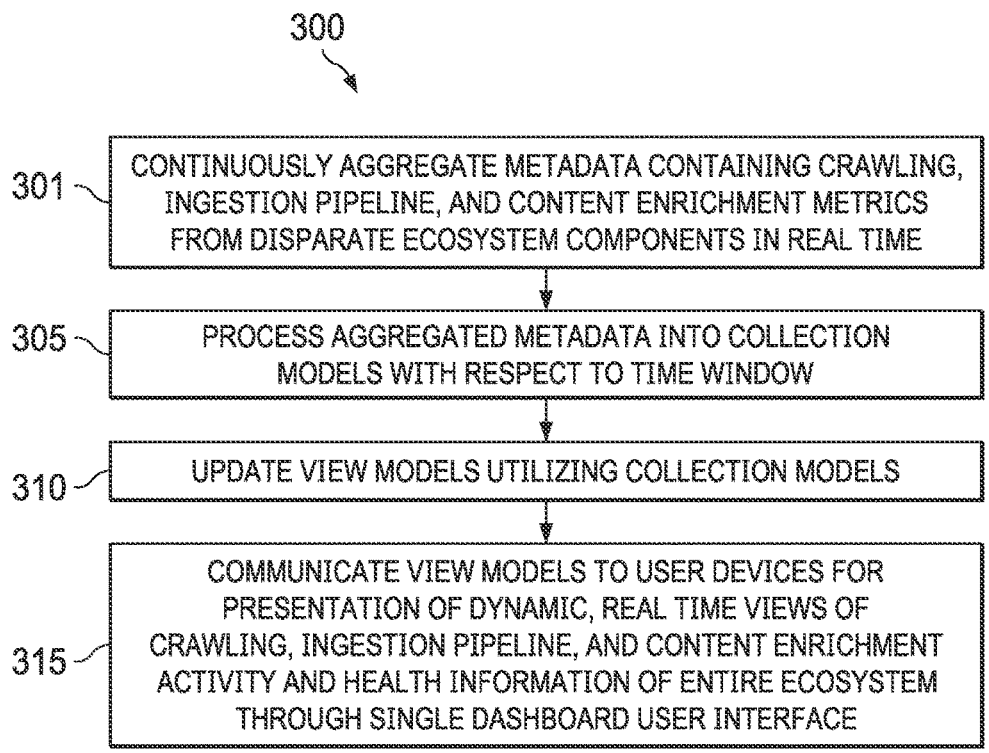
FIG. 3 is a flow chart illustrating an example of an ecosystem monitoring method according to some embodiments.

FIG. 3 is a flow chart illustrating an example of an ecosystem monitoring method 300 performed by dashboard monitoring system 200. In some embodiments, dashboard monitoring system 200 can be configured for continuously aggregating, in real time, metrics from disparate ecosystem components of ecosystem 250 (e.g., a data ingestion pipeline, a social media crawler, a web crawler, a data crawler configured for an enterprise system, and/or a predictive content analytics module of ecosystem 100 shown in FIG. 1) (301). The metrics thus aggregated can include various measures of, for instance, crawling job activities, data ingestion activities, and content enrichment activities, as well as health statuses of the disparate ecosystem components of the ecosystem.

In some embodiments, the dashboard monitoring system can process the metrics from the disparate ecosystem components of the ecosystem into collection models (305). This processing can be done with respect to a time window.

The size of the time window (which corresponds to a length of time) can be user-configurable (e.g., last hour, last 24 hours, last 7 days, etc.). Because the dashboard monitoring system can monitor the entire ecosystem in real time or near real time (with operational delay only), the time window is always changing with respect to time (e.g., on-demand or by default to show the metrics in the last hour from the current time, last 24 hours from the current time, last 7 days from the current time, etc.). Accordingly, this time window can be characterized as a sliding, moving, or changing time window. This is further explained below.

As also explained below, dashboard monitoring system 200 includes a dashboard service that users (e.g., administrators of ecosystem 250) can use to view the real time or near real time activity and health information of the disparate ecosystem components in the ecosystem on their devices (e.g., user devices 240). In some embodiments, the dashboard service can be implemented as a web server that can be accessed over the Internet. This allows many different types of user devices, including any cross-platform, Internet-enabled device, to access dashboard monitoring system 200 remotely.

In some embodiments, responsive to a user (e.g., an administrator of ecosystem 250) signing in to a dashboard user interface of dashboard monitoring system 200 on user device 240 through the dashboard service provided by dashboard monitoring system 200, the dashboard user interface may send a view request to dashboard monitoring system 200 to obtain a default view of ecosystem components of ecosystem 250. In response, dashboard monitoring system 200 may send a default view model. Each view model can have an associated filter definition. The default view model may correspond to a collection model. As further explained below, the collection model represents a functional data structure that is used by dashboard monitoring system 200 internally to aggregate particular sets of metrics streamed from different ecosystem components. The default view model may further specify a default layout with filters set to none. As a non-limiting example, the default view may be rendered by a browser running on user device 240 and displayed within the dashboard user interface.

Responsive to the view request from the dashboard user interface, dashboard monitoring system 200 can dynamically generate or update a view model. Since, at any given time, multiple users may sign in to dashboard monitoring system 200 to monitor ecosystem 250, dashboard monitoring system 200 may receive multiple view requests at any given time. To this end, dashboard monitoring system 200 is operable to simultaneously or substantially simultaneously generate and/or update a plurality of view models (310). Each view model of the view models can be configured for a view of certain crawling, data ingestion, and/or content enrichment metrics from all or a portion of all the disparate ecosystem components of the ecosystem.

In some embodiments, dashboard monitoring system 200 can communicate a view model or multiple view models to dashboard user interfaces on user devices 240 (315). A view model can represent a summation of metrics based on a changing time window of all jobs performed separately by ecosystem components. As a non-limiting example, a view model can be written in a markup language such as eXtensible Markup Language (XML). As another example, a view model can be user-configurable (e.g., through a user-friendly user interface) and dynamic in real time.

A view can be derived from a view model and multiple user sessions can share a single view model. In turn, dynamic, real time views can be rendered (e.g., by browser applications and/or dashboard monitoring applications running on user devices 240) for displaying crawling, data ingestion, and content enrichment activities and statuses of the disparate ecosystem components in ecosystem 250 through the dashboard user interfaces on user devices 240 (315).

Figure 4:
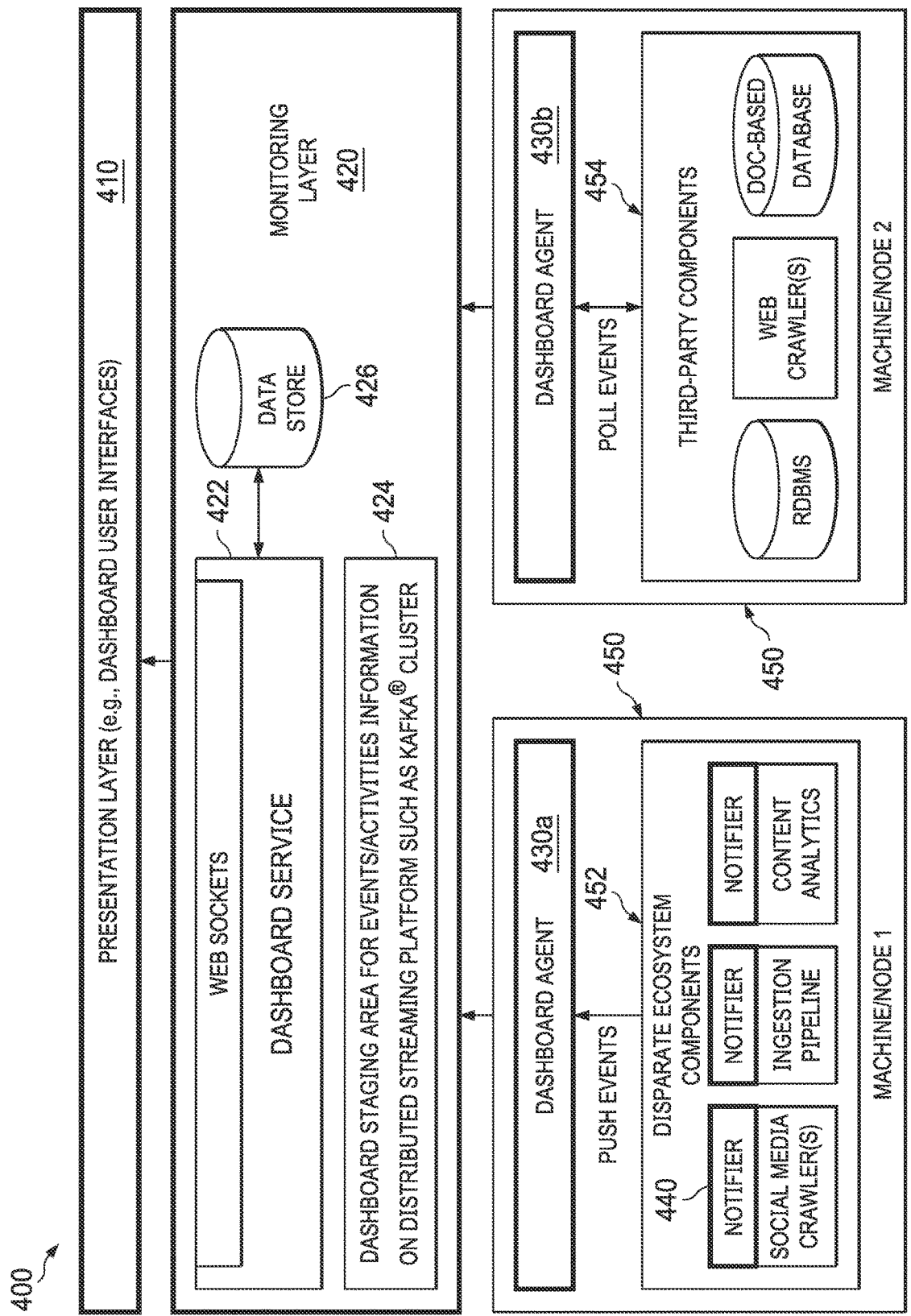
FIG. 4 depicts a diagrammatic representation of an example of a dashboard monitoring system configured for monitoring disparate ecosystem components and third-party components according to some embodiments.

FIG. 4 depicts a diagrammatic representation of an example of dashboard monitoring system 400. In some embodiments, dashboard monitoring system 400 includes presentation layer 410 and monitoring layer 420. In the example of FIG. 4, presentation layer 410 of dashboard monitoring system 400 includes dashboard user interfaces that are hosted by dashboard monitoring system 400 and run in browser applications (and/or other suitable hosted enterprise applications) on user devices. In some embodiments, monitoring layer 420 includes dashboard service 422, dashboard staging area 424, dashboard monitoring system 400 and data store 426.

Monitoring data flows among disparate ecosystem components can be extremely complex. Data flows can be affected by many reasons. For example, data may flow from a source to a crawler to a data ingestion pipeline to a content analytics module and back to the data ingestion pipeline and then to a database for persistence. Such a data flow can involve many processes and/or ecosystem components. Data may get stuck if an ecosystem component is down or is locked for another resource. To solve this kind of data flow problem, an administrator would need to find out why and take necessary action to repair. Further, there is a need to proactively monitor how each ecosystem component is performing (e.g., how is this crawling job doing, how many tweets are received, processed, and/or persisted, etc.), how the ecosystem system overall is performing, and so on. What is needed, therefore, is an end-to-end ecosystem monitoring solution. This end-to-end ecosystem monitoring solution should work in any large computing environment that implements a distributed storage framework with a distributed file system (e.g., Apache HADOOP framework with HADOOP Distributed File System (HDFS)) as well as smaller computing environments that do not implement a distributed storage framework.

In one aspect, the dashboard user interface can be a "one-stop" user interface where a user can access various services deployed in an ecosystem (which are provided by disparate ecosystem components and third-party components) and get a near real time "what is happening view" of the entire ecosystem. In this case, "near" real time takes into consideration the operational delay necessitated by the size and complexity of the ecosystem. In some cases, any such operational delay may not be noticeable by a user and, therefore, the view on the dashboard user interface may be considered a real time view of the entire ecosystem (or a portion thereof, depending on what the user wants to view).

The near real time view enables the user to take necessary actions in a timely manner. The dashboard user interface can include various widgets, each of which can enable a user to perform a function or access a service provided by dashboard monitoring system 400. In some embodiments, dashboard monitoring system 400 can be configured to provide health checks, application checks, and centralized log management, and to support cross-platform, flexible, and configurable deployments.

In some embodiments, health checks can include application availability (e.g., checking whether an application node is up or down); system health (e.g., checking the central processing unit (CPU), memory, and load of a node (a server machine) in the ecosystem and reporting information on CPU/memory utilization and load); component monitoring (e.g., checking the availability of an ecosystem component); auto-discover (which provides the ability to add nodes into or remove nodes from the ecosystem); and storage monitoring (which provides the ability to check disk resources such as the percentage to reach full capacity).

In some embodiments, application checks can include alert management (which provides the ability to send alerts by email and/or through the dashboard service); events persistence and query (which provides the ability to persist events and query based on criticality, date, message, etc.); data flow monitoring from application (which reports data flow across an application); operation intelligence (which provides the ability to proactively enable/disable job operations based on the health of ecosystem components down the line); data stage (which provides the ability to display, on the dashboard user interface, data movement at a given point of time); intrusive process monitoring (which provides the ability to monitor specific processes (e.g., jobs) within individual ecosystem components); application performance (which provides the ability to check response time, failovers, etc.).

In some embodiments, the centralized log management provides the ability to retrieve/view logs of specific ecosystem component involved in the ecosystem.

Dashboard monitoring system 400 can be configured to monitor all kinds of ecosystem components in the ecosystem, including those that might be proprietary to an operator of an enterprise computing system and those that are made by third parties. In some embodiments, proprietary components can be referred to as white box components and third-party components can be referred to as black box components. In some embodiments, optional dashboard agents 430a, 430b may be deployed to nodes 1, 2 which run on server machines 450. Each optional dashboard agent can be implemented as a lightweight independent service that runs on a node (machine) in the ecosystem.

In the example of FIG. 4, disparate ecosystem components 452 run on node 1 and third-party components 454 run on node 2. Depending upon the communication mechanisms utilized by these disparate ecosystem components, there can be many deployment options. Some example use cases are listed in Table 1 below, with each use case referring to a target ecosystem component as a "target application."

TABLE 1

Examples of Deployment Options

| Dashboard Agent | Medium | Use Case |
| --- | --- | --- |
| Inside the target application | KAFKA | 1) The target application publishes events in a moderate way.<br>2) The user of the system does not want a dashboard agent installed and run externally. |
| Inside the target application | REST API | 1) The target application does not want to run a dashboard agent inside.<br>2) This is a lighter solution than the option above. |
| Outside the target application | KAFKA | 1) The target application is considered a mission critical system and the user of the system does not want to miss even a single event. |
| Outside the target application | REST API | 1) The user of the system does not want to install KAFKA.<br>2) Message delivery is guaranteed but less than the KAFKA option. |
| The target application sends events and activities directly to the dashboard service without a dashboard agent. | REST API | 1) The target application is closed (in the sense that it cannot embed a dashboard agent or a dashboard notifier). |

"REST" stands for Representational State Transfer (REST), which is a style of software architecture that defines a set of constraints for creating web services. Web service APIs that adhere to the REST architectural constraints can be referred to as REST APIs.

The exemplary deployment options show that dashboard monitoring system 400 is feasible for both HADOOP and non-HADOOP environment. In the example of FIG. 4, notifier 440 can use dashboard agent 430a to push events captured by notifier 440 regarding disparate ecosystem components 452 to dashboard service 422 (through dashboard staging area 424 which, in some embodiments, can implement a distributed streaming platform such as a KAFKA cluster). Notifier 440 can capture the events as they occur and stream the events to dashboard agent 430a asynchronously. For non-streaming cases (non-KAFKA), notifier 440 can function like a wrapper that collects and sends data to dashboard agent 430a. Some ecosystem components can send events to dashboard service 422 directly. For example, a crawler that already has a wrapper can make a call to dashboard monitoring system 400 through its REST API and publish the events (which are staged in dashboard staging area 424). This is referred to as a push mechanism.

Depending upon the type of an ecosystem component, dashboard monitoring system 400 may utilize a push or poll mechanism. Dashboard monitoring system 400 has knowledge of the type of each ecosystem component, how each ecosystem component behaves, and what metrics they generate. This knowledge is gained when an ecosystem component is registered with dashboard monitoring system 400. Component registration may entail registering an ecosystem component by a component type which specifies what events the ecosystem component publishes. Sometimes an ecosystem component may report discrete events. Once an ecosystem component is registered, dashboard monitoring system 400 can act according to the ecosystem component's behavior—how they publish, what they publish, how often they publish, etc.

Each ecosystem component may publish heartbeats to dashboard monitoring system 400. In computer science, a heartbeat refers to a periodic (e.g., at a time interval such as 1 minute) signal generated by hardware or software to indicate normal operation. Here, a heartbeat from an ecosystem component can indicate the availability of the ecosystem component. Likewise, a heartbeat from an ecosystem node can indicate the availability of the ecosystem node.

As discussed above, the scope and metrics published by disparate ecosystem components can be very different. For example, metrics published by crawlers (e.g., a TWITTER crawler, a web crawler, an ECM crawler) can include the status of a job ("job_status") and the number of messages or documents crawled ("crawled"), while metrics published by ingestion pipeline components can include the number of messages queued ("queued"), the number of messages submitted to the pipeline ("submitted"), the number of messages processed ("processed"), the number of message enriched by a content analytics module ("enriched"), and the number of message persisted ("persisted"). In addition, error events reported by these ecosystem components can include an event identification ("event_id"), a short description of the event ("event_name"), a full description of the event (error) ("event_description"), and a severity of the event ("event_severity") such as critical error, major error, warning, or information. These events and activities can be stored in data store 426.

In some embodiments, dashboard monitoring system 400 can receive these metrics (e.g., measures of crawling, data ingestion, and content enrichment activities and statuses) pushed, through dashboard agents 430a, from dashboard notifiers 440 running in disparate ecosystem components 452 or a portion thereof. In some embodiments, dashboard monitoring system 400 can also poll the metrics through dashboard agents installed on ecosystem nodes (e.g., dashboard agent 430b on node 2) and communicatively connected to third-party ecosystem components or a portion thereof. Dashboard monitoring system 400 is operable to continuously and dynamically process, via dashboard service 422, metrics published by an ecosystem component. As explained further below, dashboard service 422 is operable to process, aggregate, and send the metrics to presentation layer 410 over web sockets according to user-selected models and filters. In this way, different views can be presented, through dashboard user interfaces, to different user sessions with real time data.

The web sockets conform to a computer communications protocol referred to as the WebSocket protocol. The WebSocket specification defines an API for establishing socket connections between a web browser and a server. A socket connection is a persistent connection between two parties and both the client and the server can start sending data at any time.

FIG. 5A depicts a diagrammatic representation of an example of dashboard user interface 500 according to some embodiments. In the example of FIG. 5A, view 550 is scoped to a time window (e.g., "last hour") and shows the job statuses (e.g., "running," "completed," and "failed") and job activities (e.g., "crawled" and "persisted") of disparate ecosystem components 552, 554, 556, 558. In some embodiments, time-based filter 501 can be used to specify a time window (e.g., the past five minutes, the past seven hours, the past 24 hours, the last seven days, etc.) that a user wants to view.

In addition to time-based filter 501, view 550 can be dynamically modified using group filter 505 and/or job filter 510. Jobs can be grouped, and job groups can be used to change view 550. FIG. 5B shows pull down menu 507 when group filter 505 is selected. FIG. 5B shows that dashboard user interface 500 can present information specific to a job group based on the same view model by using a job group filter.

In some embodiments, jobs can be created, edited, and managed through dashboard user interface 500. Likewise, job groups can be created, edited, and managed through dashboard user interface 500. FIG. 6 depicts a diagrammatic representation of job group configuration console 600 according to some embodiments. As illustrated in FIG. 6, a job (e.g., "Job 5" shown in FIG. 5A) can be started, stopped, deleted, edited, or cloned using job group configuration console 600. Jobs can also be created by an administrator using an administration console particular to an ecosystem component. For example, an ECM system can have an administration console, a data ingestion pipeline can have an administration console, etc.

In some embodiments, metadata such as an activity regarding a job performed by an ecosystem component and/or event information regarding the health status of the ecosystem component can be aggregated by the dashboard monitoring system. Here, "metadata" does not generically refer to any data that describes other data. Rather, "metadata" here refers to the information contained in tuples from disparate ecosystem components. As an example, a tuple can contain a component name, a project or group identifier (ID), a job ID, a metric or event name, a metric or event value, and a timestamp. A "project" can be a grouping mechanism. A metric or event name can be "status," "crawled," etc. A corresponding metric or event value can be any textual or numerical value, for instance, "running," "completed," "failed," "25," "0," etc. Embodiments of a dashboard monitoring system disclosed herein are particularly configured for aggregating and processing metadata contained in these tuples. For example, "metadata regarding a job" can refer to "job attributes" of a job performed by an ecosystem component which pertains to an activity performed by the ecosystem component. Accordingly, hereinafter, "metadata" refers to tuple information aggregated by the dashboard monitoring system disclosed herein.

In some embodiments, some metadata (e.g., job attributes) may be included in tuples used by the dashboard monitoring system and some metadata may be used for other purposes (e.g., performance analytics, reporting, internal auditing, etc.). In some embodiments, a user of the dashboard monitoring system can configure what metadata of interest should be processed and/or whether they should be included in a view.

Figure 7:
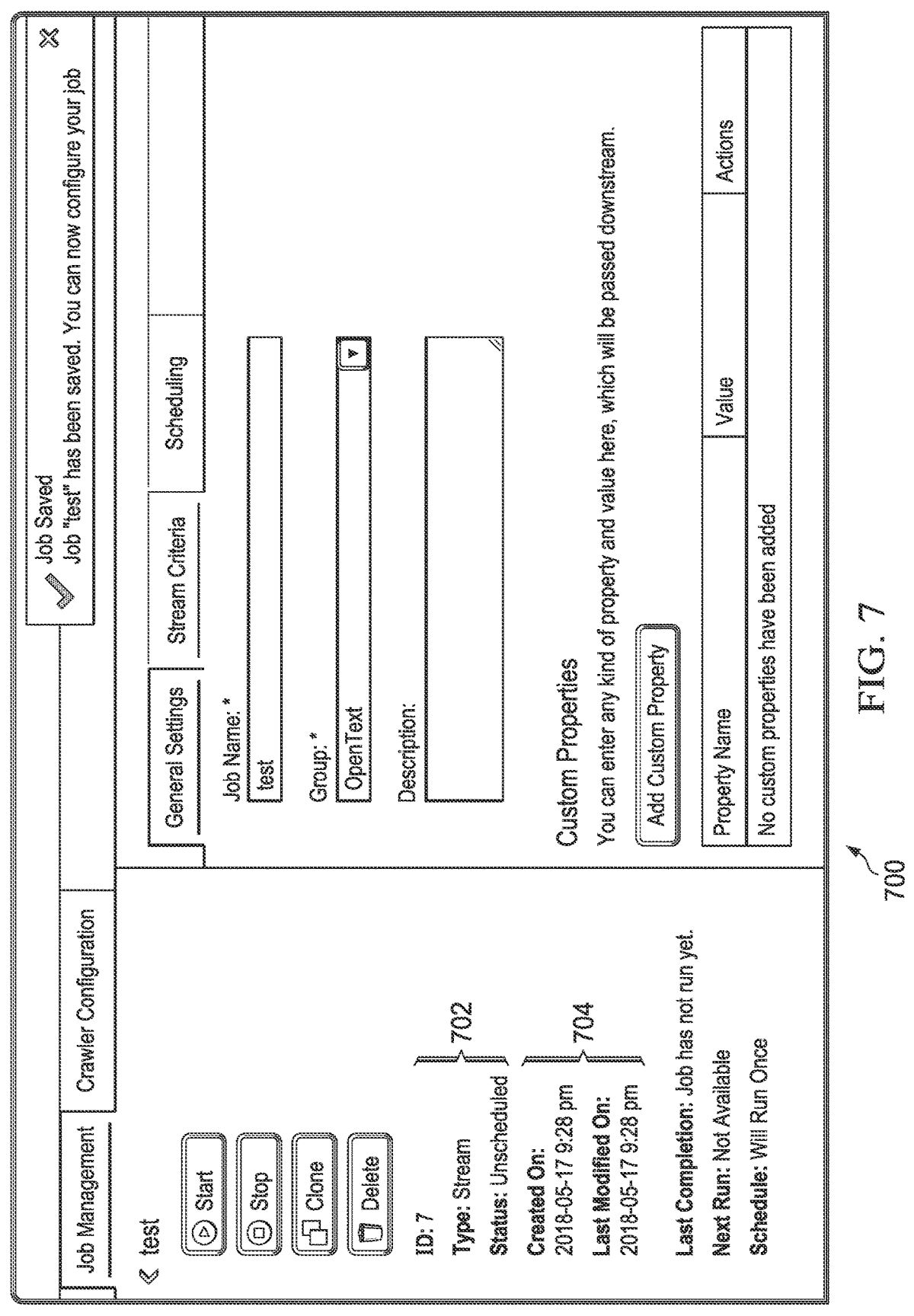

For example, FIG. 7 depicts a diagrammatic representation of an example of job management console 700 according to some embodiments. When a new job is created (e.g., "Job 7" shown in FIG. 7), job attributes 702 and job attributes 704 and their values are captured. While attributes 702 may be used in computing a default view for the new job, job attributes 704 are not used by the default view. Thus, values of job attributes 704 are not shown in the default view for the new job. As illustrated in the example of FIG. 7, job management console 700 provides an ability for a user to add any kind of custom property and value that can be passed downstream to another computing facility.

As a non-limiting example, responsive to a user starting a job through dashboard user interface 500, the user can view how the job (e.g., "job 7") is being performed in real time by disparate ecosystem components (e.g., a crawler crawling a social media feed, a data ingestion pipeline ingesting the crawled data, a text mining engine mining the data being ingested, etc.). Responsive to the user changing a filter, the underlying dashboard monitoring system can aggregate the metadata and present them in real time an updated view that reflects what the user has specified.

In some embodiments, a job can be triggered by an ecosystem component itself. For instance, when a job is triggered by a social media crawler, a worker thread communicates with the trigger crawler service which opens a connection with a social media server. The worker thread tries to crawl or get data from the social media server based on a service statement that it is given (i.e., its job description). The worker thread pushes the data to the crawler service which reads the data (e.g., each and every message, tweet, comment, or post). The crawler service keeps the data and can use a dashboard notifier to publish the data to the dash board service and, at the same time, can push the data to a staging area (e.g., staging area 130 shown in FIG. 1) so a downstream computing facility (e.g., data ingestion pipeline 140 shown in FIG. 1) can access and process the data.

Figure 8:
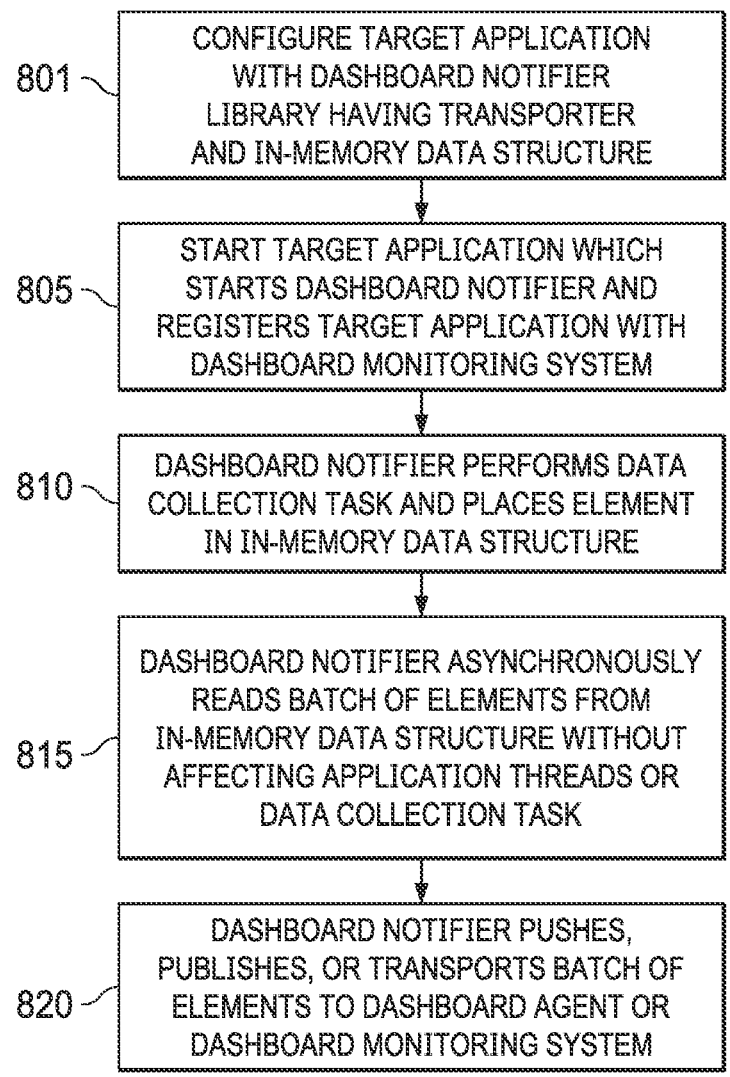
FIG. 8 is a flow chart illustrating an example operation of a dashboard notifier according to some embodiments.

Dashboard notifiers are a unique feature of the ecosystem monitoring solution disclosed herein. FIG. 8 is a flow chart illustrating an example operation of a dashboard notifier according to some embodiments.

In some embodiments, ecosystem monitoring method 800 may include configuring an ecosystem component (a target application) with a dashboard notifier library (801). The dashboard notifier library can include a transporter and an in-memory data structure configured for asynchronous processing (e.g., a circularly-connected data structure such as a ring buffer). Once started, the dashboard notifier can perform the following functions: register a target application based on its configuration, start sending heartbeat signals to a dashboard service, and perform data collection tasks. Data collection tasks can include collecting, mapping, and sending metrics and events to the dashboard service. The dashboard notifier can perform these tasks asynchronously without blocking the target application's working thread, so that there is very negligible performance impact on the target application.

Method 800 may further include starting up the target application configured with the dashboard notifier library (e.g., in a bootstrapping process) (803). This starts up the dashboard notifier embedded in the target application. Upon starting up, the dashboard notifier registers the target application with the dashboard monitoring system.

Figure 9:
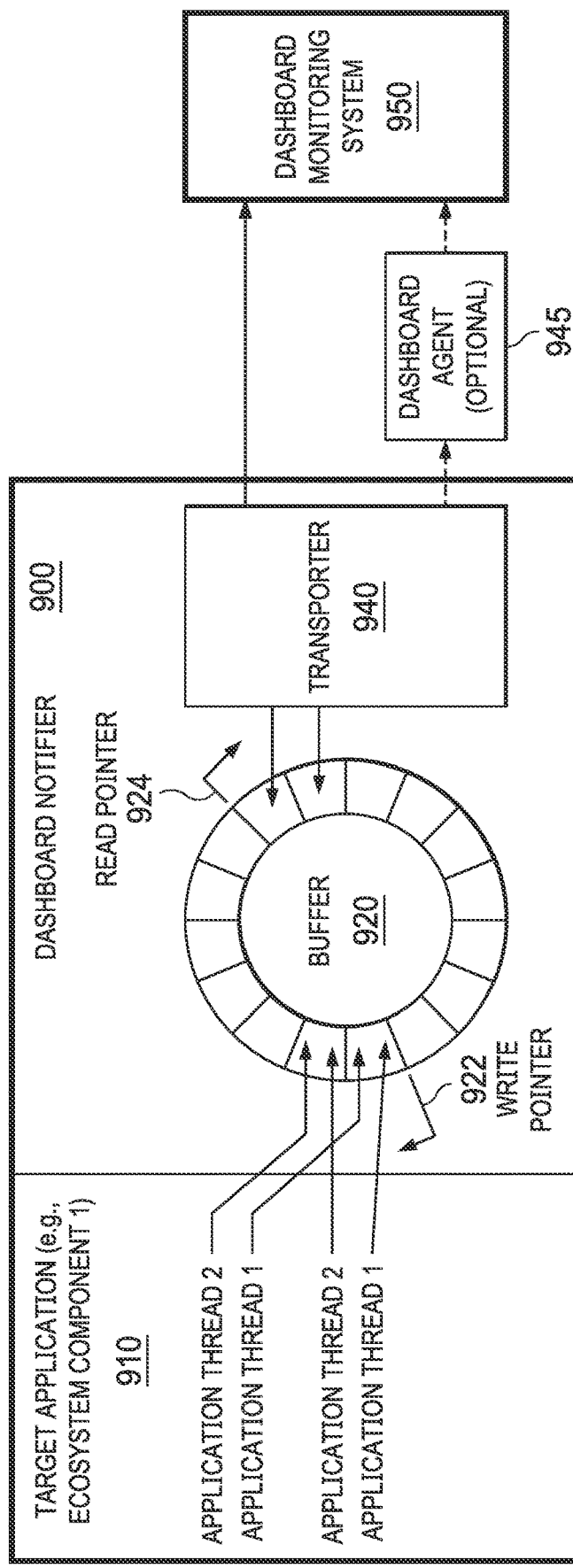
FIG. 9 depicts a diagrammatic representation of an example of a dashboard notifier according to some embodiments.

Method 800 may further include the dashboard notifier performing a data collection task and placing elements from the target application in the in-memory data structure (810). As illustrated in FIG. 9, which depicts a diagrammatic representation of an example of dashboard notifier 900 according to some embodiments, the in-memory data structure can be implemented as buffer 920. Buffer 920 may have a ring-like structure and hence may be referred to as a ring buffer. Buffer 920 has write pointer 922 and read pointer 924. Application threads 1, 2 of target application 920 can write elements to buffer 920 using write pointer 922. Dashboard notifier 900 itself periodically polls both target application 920 and node 990 (on which target application 910 is run) for health stats.

In some embodiments, elements from target application 920 (e.g., ecosystem component 1) can include a measure of a job activity by target application 920 or an event occurring at target application 920. Examples of a job activity can include a crawling activity, a data ingestion activity, or a content enrichment activity. Examples of an event can include a lifecycle event such as a health status or state of target application 920.

Asynchronously, transporter 940 can read a batch of elements from buffer 920 using read pointer 924 (815). In this way, reading and writing can be performed asynchronously without affecting each other. The batch of elements can then be pushed, published, or otherwise transported by transporter 940 to the dashboard monitoring system (820). As a non-limiting example, optionally, transporter 940 can be configured to push or publish the batch of elements to dashboard agent 945 that is local to target application 910 and dashboard agent 945, in turn, can push or publish the batch of elements to dashboard monitoring system 950.

In some embodiments, dashboard notifier 900 can determine whether dashboard monitoring system 950 is offline or not available. Responsive to a determination by dashboard notifier 900 that dashboard monitoring system 950 is offline or not available, dashboard notifier 900 can place a worker thread in a waiting mode and wake up the worker thread when dashboard monitoring system 950 is online or available. As a non-limiting example, dashboard notifier 900 can be written in Java. In some embodiments, each "white box" target application can embed a dashboard notifier. In some embodiments, such a target application can use a dashboard notifier to log events. For a "black box" target application, a wrapper may be written and deployed to the target application. The wrapper specifies what activity or event information is to be stored in a database.

The dashboard notifier provides the dashboard monitoring system with the ability to perform data collection within a target application in memory in real time without having to the target application code. To integrate a dashboard notifier with a target application, an application developer (also referred to as an integrator) can include the notifier library by having a dependency of it. The dashboard notifier has a configuration specific to the target application. Example configuration parameters are as follows:

Dashboard Service URI
Enable Flag
Heart beat interval
Max Buffer Size
Transporter (e.g., REST, KAFKA, etc.)

Dashboard Notifier Bootstrapping

Dashboard notifier bootstraps (starts up) along with a target application. Below provide example pseudocode steps for initializing a dashboard notifier.

```
init( )
    set initDone to true
```

```
    set config to readConfiguration( )
    if(config is NOT valid) then
        //Terminate the booting
        Log the error
        set initDone to false
        return
    end If
    set enabled to config.getEnabled( )
    if(NOT enabled) then
        return
    end if
    set componentId to registerComponent(config)
    if(error occurred) then
        //Terminate the booting
        Log the error
        set initDone to false
        return
    end if
    set transporter to loadTransporter(config)
    if(error occurred) then
        //Terminate the booting
        Log the error
        set initDone to false
        return
    end if
    //Spawned in another thread
    spawnHeartBeatTask( )
end of init
```

Heartbeat Task Pseudocode

```
spawnHeartBeatTask( )
    set N to config.getHeartBeatInterval( )
    for every N seconds
        if(shutDown is true) then
            return
        end if
        sendHeartbeat(componentId)
        if(heartBeat is successful) then
            notifyAllDataSendingWorkers( )
        end if
    end for
end of spawnHeartBeatTask
```

Data Collection and Data Transportation

Data collection and data transportation are asynchronous tasks performed by the dashboard notifier. The data collection task runs with the target application's thread while transportation task is run in separate thread(s).

Data Collection Task Pseudocode

```
sendMetricOrEvent(element)
    //element can be event or metric
    attachComponentId(event or metric)
    placeElementIntoRingbuffer( )
    if(ringBufferReaders are NOT running)
        //spawned in another threads
        spawn readRingBuffer( ) task
    end if
end of sendMetricOrEvent
```

Data Transportation Task Pseudocode

```
readRingBuffer( )
    While ringBuffer is Empty
        //Read batch of Elements from ringBuffer
        set elements to readTheElements( )
        //Sending elements using transporter
        transporter.send(elements)
        if(dashboard service NOT available) then
            //Threads are going to waiting mode
```

```
        parkThisWorkerThread( )
    end if
    if(sending successful) then
        removeElementsFromBuffer( )
    end if
end While
end of readRingBuffer
```

The dashboard notifier can be disabled by default and then enabled by setting an external configuration parameter. This way, a target application is free to determine whether report its metrics and events to the dashboard service. To do so, the application developer can include, for example, statements below (shown in pseudo code) in the integration code:

```
//At the time of a target application bootstrapping
//initialize the dashboard notifier
DashboardNotifier.init(ConfigProperties)
//Whenever the target application wants to log the metric or
event
```

DashboardNotifier.metric(key,value).metadata(key, value).metadata(key,value).submit( )

Figure 10:
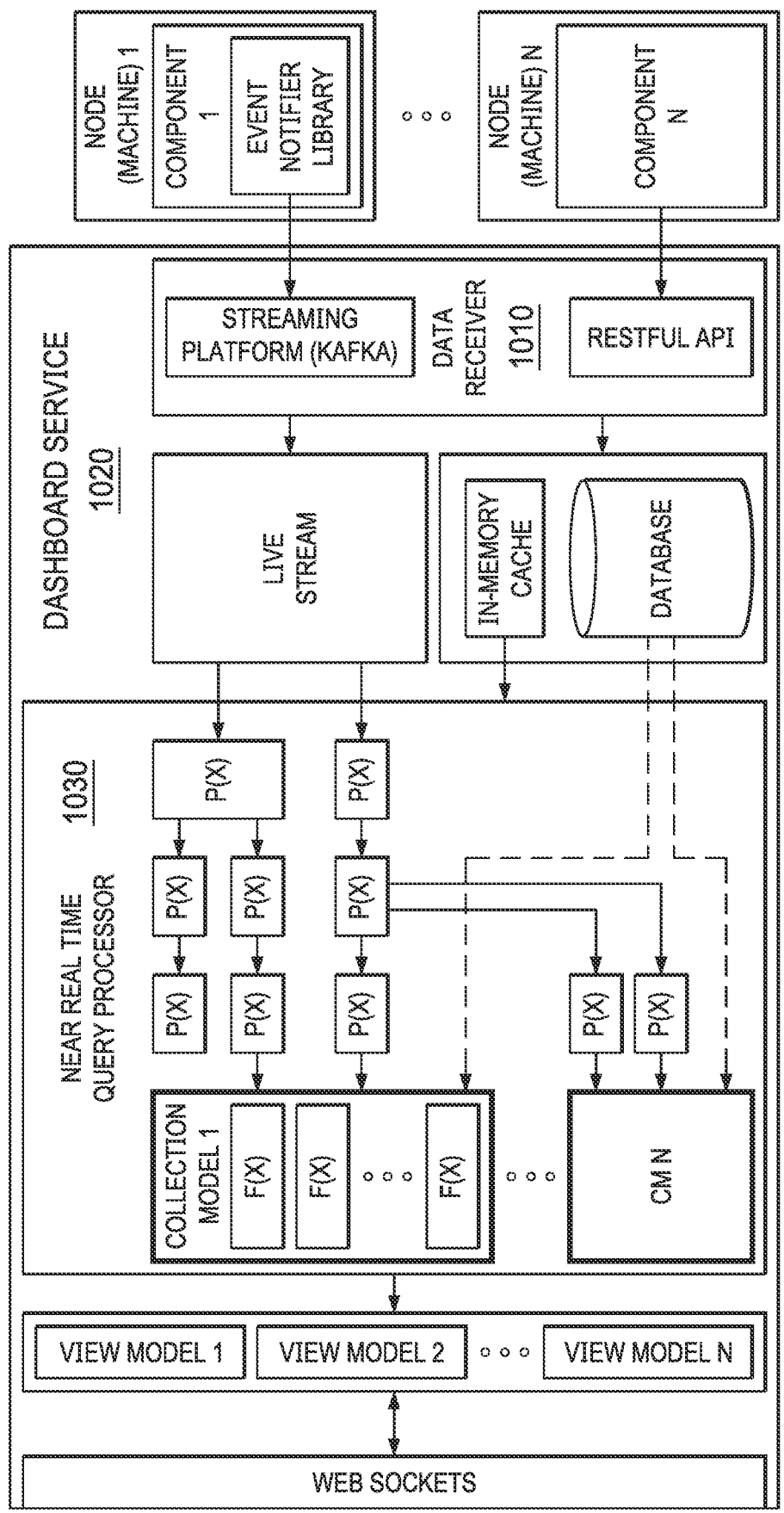
FIG. 10 depicts a diagrammatic representation of an example of a dashboard architecture according to some embodiments.

In some embodiments, transporter 940 can be configured to accommodate different transport protocols and/or different recipients. For example, transporter 940 can be configured to make a REST API call to a data receiver of the dashboard monitoring system to communicate the batch of elements to the data receiver. FIG. 10 depicts a diagrammatic representation of an example of dashboard architecture 1000 with data receiver 1010 according to some embodiments.

Dashboard architecture 1000 can be very comprehensive and versatile as well as very flexible and configurable. For example, as illustrated in FIG. 10, data receiver 1010 can be configured with REST API and/or a horizontally scalable, distributed streamlining platform (e.g., the Apache KAFKA platform). Data received through REST API (e.g., from an ECM crawler) can be cached and/or stored in a database, while data streams received through the distributed streaming platform (e.g., from a social media crawler) can be stored in a distributed, replicated fault-tolerant cluster (e.g., a data lake on the distributing streaming platform).

The ability of data receiver 1010 to receive data from ecosystem components 1 . . . N running on ecosystem nodes 1 . . . N through different configurable communication channels and transport mechanisms provides dashboard architecture 1000 with highly flexible deployment options. Additionally, component registration, component-wise post activity/event metrics, and component/node heartbeats are all configurable and not fixed.

A user may sign in to dashboard service 1020 provided by dashboard architecture 1000 through a single sign-on service (which is a session and user authentication service that permits a user to use one set of login credentials such as username and password to access multiple applications). Once signed in to dashboard service 1020, the user can monitor and view reports on all ecosystem components. At this time, a user session is started and, upon starting up the user session, dashboard service 1020 can automatically detect what ecosystem components are running and present pieces of information in real time to the user in the user session. As discussed above, the user can open another window and start another user session with dashboard service 1020.

Multiple users of dashboard architecture 1000 can utilize dashboard service 1020 this way. As described above, dashboard architecture 1000 can include a presentation layer (e.g., presentation layer 410 shown in FIG. 4) with dashboard user interfaces. Each dashboard user interface enables a user to define a time-based scope (e.g., an ever-changing time window) and apply filter(s) per job and/or job group. At any given time, there can be multiple user sessions on one or more user devices and, during each user session, dashboard service 1020 may receive multiple view requests (queries).

Initially, a user signed in to dashboard service 1020 on a user device can get a default view of a user dashboard showing ecosystem components (that have been automatically detected by dashboard service 1020 as currently running) in a default time window that is computed based on real time information provided by the ecosystem components. As described above, the user can request a different view of the user dashboard by changing the time window, selecting a job, and/or selecting a job group. For each view request, dashboard service 1020 is operable to compute a time window and, at the same time, determine what gets presented in that time window based on user-selectable filter(s). An appropriate result can then be communicated to the user dashboard in near real time (with only negligible operational delay). The user can open a new window on the user device, define another time-based scope (another time window) and perhaps different filter(s), and view different results.

As discussed above, dashboard service 1020 can monitor data stages (e.g., data stages in the enrichment of data which include crawling, ingestion, and enrichment). Additionally, dashboard service 1020 can monitor how many jobs are created, modified, stopped, completed, or cloned, etc. As a result, dashboard service 1020 can provide substantial insight into such data stages. This and other insights (and metadata stored in data lakes) can be utilized by other systems and/or computing platforms for further analyses (e.g., predictive content analytics). Results from such analyses (e.g., a predicted trend on a social media platform, popularity of a candidate among voters in an election, etc.) can be added to the user dashboard through dashboard service 1020 (e.g., as part of a group-level report). Any registered component that is configured to publish its activity and health information to dashboard service 1020 can be monitored.

Each user using dashboard service 1020 can independently configure the time scope that defines a moving or changing time window. Each user can also independently select a job filter, a group filter, or no filter at all. Dashboard service 1020 is operable to aggregate data from disparate ecosystem components and prepare them so that users can readily view different scopes of information at any given time, including viewing, simultaneously and immediately, the same component or group of components from the same perspective or from different perspectives. In some embodiments, this dashboarding functionality can be achieved by leveraging a new query processor referred to in FIG. 10 as query processor 1030.

Query processor 1030 is a new processor that can be implemented in Java and that can process real time input data streams and continuous queries. Query processor 1030 is capable of dynamically constructing a Boolean expression tree. Each node in this dynamically constructed Boolean expression tree is a predicate (which a condition or a Boolean-valued function) for a collection model. To facilitate faster, efficient, and non-blocking processing, every object in query processor 1030 implements the Reactive Streams Specification, available at http://www.reactive-streams.org, which is a standard for communications between objects across a network. Additionally, Query processor 1030 implements new syntax and extensions for metadata operations and active stream subscription. Every communication between a predicate node in the Boolean expression tree and a collection node in a collection model is asynchronous. This allows for efficient use of network processor and memory by query processor 1030.

The real time input data streams contain tuples from disparate ecosystem components (using push and/or poll operations). Each tuple contains metadata that can be utilized for view and for function. For example, a view may be driven by a component ID and a set of metrics (e.g., "running," "crawled," etc.). The view is modeled based on the identified ecosystem component and metric. The rest of metrics can be used to define and display any combination of filters (e.g., based on time, job, group, project, etc.) on dashboard user interfaces. Dashboard service 1020 can support different dashboard user interfaces. Accordingly, dashboard user interfaces for dashboard service 1020 disclosed herein may vary from implementation to implementation.

In some embodiments, dashboard service 1020 can carry a job activity from the backend to the frontend through time query processor 1030. This is illustrated in FIG. 11 which depicts a diagrammatic representation of an example of data processing operation 1100 of a dashboard monitoring system configured for monitoring a complex computing platform or ecosystem.

At the backend, continuous input streams of component data are pushed and/or polled from disparate ecosystem components of the ecosystem. Sequence ID generator may generate a sequence ID for each tuple 1110 from an ecosystem component. Here, a tuple can be a JavaScript Object Notation (JSON) string or a finite ordered list of elements pushed or polled from an ecosystem component. These tuples contain metrics that can be unique to each ecosystem component. In this context, tuple values can represent different processing stages.

Figure 11:
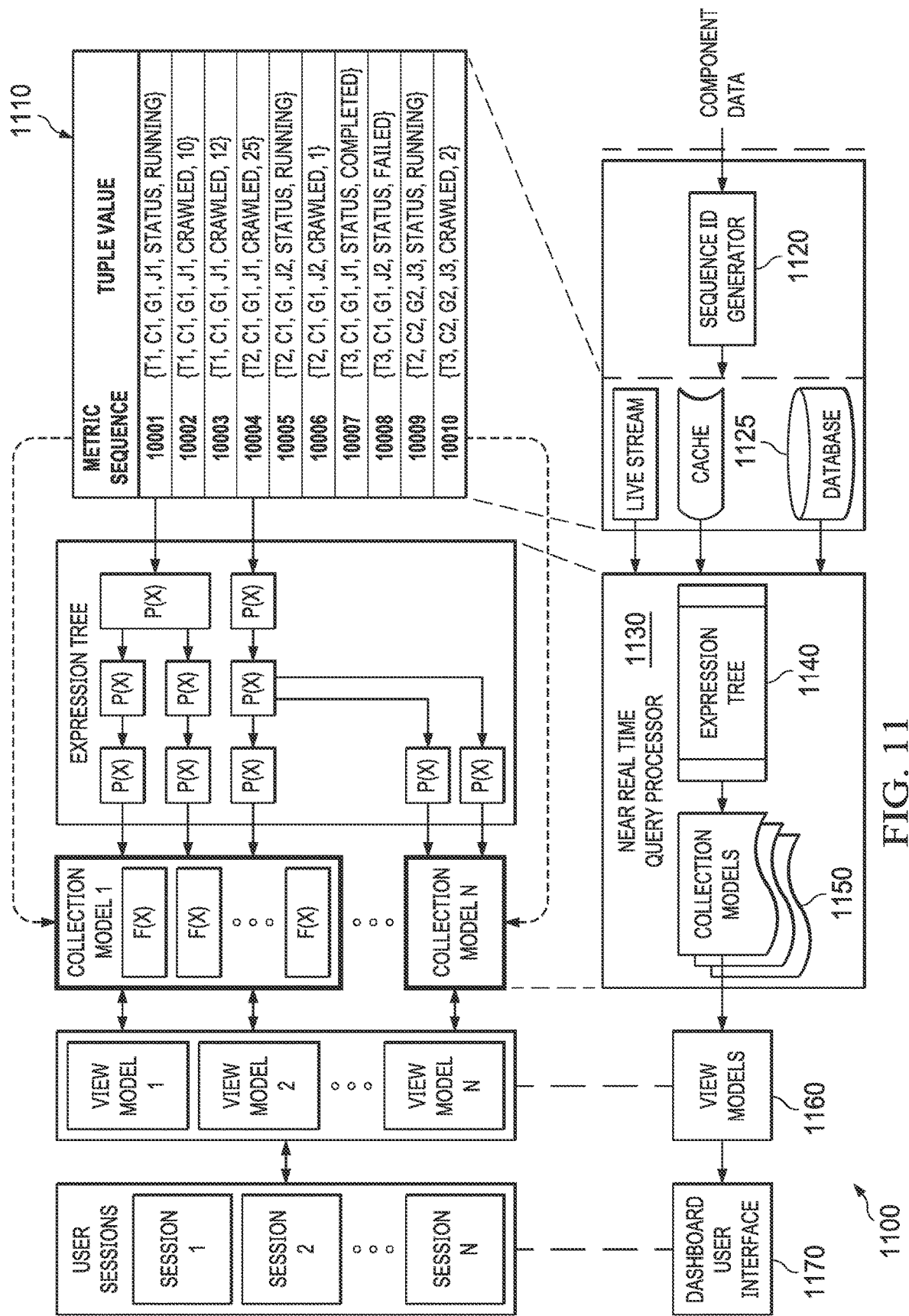
FIG. 11 depicts a diagrammatic representation of an example of a data processing operation of a dashboard monitoring system according to some embodiments.

In the example of FIG. 11, tuple 1110 contains a timestamp (t), a component ID (c), a group ID (g), a job ID (j), a metric or event name (e.g., "status," "crawled," etc.), and a metric or event value (e.g., "running," a numerical value, "completed," "failed," etc.). Each time a job for an ecosystem component is started, its initial state is computed and stored in persistence storage 1125 (e.g., a database). Thereafter, incoming tuples are continuously streamed or cached for processing by time query processor 1130. In some embodiments, continuous input streams of tuples pushed or polled from disparate ecosystem components and view requests (queries) received from dashboard user interface(s) 1170 can be processed asynchronously, dynamically, and continuously.

Figure 12:
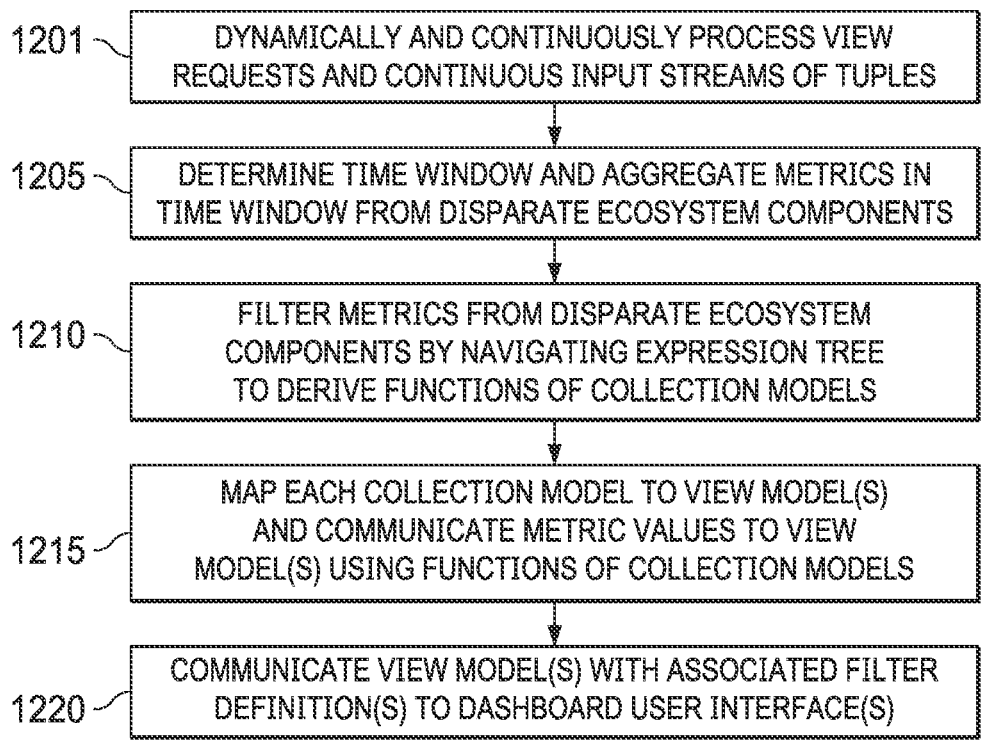
FIG. 12 is a flow chart illustrating an example of a data processing method performed by a dashboard monitoring system according to some embodiments.

Referring to method 1200 shown in FIG. 12, in some embodiments, query processor 1130 may dynamically and continuously process view requests and continuous input streams of tuples (1201). Each tuple can be considered as to three interfaces: the timestamp at which this tuple was given to the dashboard notifier; the metadata contained in the tuple (e.g., the component name, the project or group name, the job ID, etc.), and the value (e.g., the metric or event value). Metrics reflect the internal state or stages in the processing. For example, metrics for the data ingestion pipeline described above can include "queued," "submitted," "processed," "administered," and "persisted." A metric value for each such metric can be a numerical value or measure of how many documents have been queued, submitted, processed, administered, and persisted.

Collection models 1150 are a collection mechanism for the dashboard monitoring system to collect various sets of metrics from the disparate ecosystem components in a time window. A collection model can be considered as a functional data structure that is internal to the dashboard monitoring system and that is particularly configured for aggregating sets of metrics and metric values associated with the sets of metrics. In some embodiments, collection models can be formed in memory by query processor 1030. In some embodiments, collection models can be maintained on the server machine implementing the dashboard monitoring system.

As the input streams of tuples are continuous, query processor 1030 may operate to determine a time window for aggregating metrics from disparate ecosystem components (1205). This time window is always moving forward in time. Thus, aggregating the metrics in the time window will also change with respect to the current time. For example, a default time window can be an hour. Setting the current time as "t=now," query processor 1030 may aggregate metrics from disparate ecosystem components from "t=now" until time window "t=now+60" (in minutes, other time units can also be used). In some embodiments, query processor 1030 may also determine what metrics in the incoming tuples to aggregate in that time window. In this way, query processor 1030 may process only certain metrics of interest and not all of the metrics contained in the incoming tuples in that time window.

Metrics from disparate ecosystem components in the time window can then be filtered (1210). This filtering can be done by navigating a dynamically constructed expression tree 1140. To construct expression tree 1140, query processor 1130 may extract or derive predicates (p(x)'s) (e.g., p(x)=p("groupby")) from a view model (e.g., a default or user-configured view model). The view model can be predefined or user-configured. Query processor 1130 may then dynamically construct expression tree 1140 with the predicates as nodes. Predicates may also be extracted and/or derived from a filter combination (e.g., a default or user-configured job filter and/or a group filter) or a view request (query).

Expression tree 1140 can be characterized as a Boolean expression tree 1140 because each predicate is a Boolean expression. In computer science, a Boolean expression is logical statement that is either true or false. When evaluated, a Boolean expression produces a Boolean value that represents either true or false (e.g., 1 or 0).

For example, a predicate may specify a current time "Tnow" (where p(x)="Tnow"). This time-based predicate may be derived from a view model that corresponds to a "now" or "live" view. A tuple streamed from an ecosystem component in real time can have a timestamp that, when evaluated against this predicate, a Boolean value of "true" is returned.

As another example, a predicate may specify metric 1 (m1) from component 1 (c1) (where p(x)=c1 m1). Any tuple from c1 containing m1 would be evaluated to return a Boolean value of "true." This component-specific and metric-specific predicate may be derived from a view model that corresponds to a view showing c1 m1.

A goal of this filtering is to direct the metadata in tuples that the dashboard monitoring system has received from disparate ecosystem components into different views that can then be presented on the dashboard interface. These different views can show the varying stages of the jobs of all the ecosystem components. The dashboard monitoring system is continually building and changing views based on whatever metadata desired relative to a changing time window. Each view model internally maps the desired metadata between a collection model and a filter. For example, suppose metadata published by an ecosystem component include a job ID, a group ID, and a timestamp. If a main view of the ecosystem component is defined using these metadata, the rest of the views concerning this ecosystem component can be done by grouping and/or filtering of other metadata published by the ecosystem component. This is further explained below.

Leveraging the same initial state and the same Boolean express tree, query processor 1130 can derive functions (f(x)'s) for collection models 1150 from predicates evaluated to be true. The functions are a way to aggregate (hence the functions can be referred to as aggregation functions) metric values for particular metrics in the input tuples. Each tuple can contain, for instance, a timestamp (t), a component ID (c), a group or project ID (g), a job ID (j), a metric or event name, and a metric or event value. To this end, collection models 1150 can be considered functional data structures.

A collection model can be mapped to one or more view models. That is, there can be a one-to-many correspondence between a collection model and multiple view models. A view model essentially contains instructions for a frontend user application (e.g., a browser) to render a view on a display. A view model can be hard-coded or dynamically generated (e.g., based on a user-specified configuration).

As an example, collection model 1 shown in FIG. 11 may correspond to view model 1160 which specifies how a set of metrics (e.g., per their c, g, and j) should be laid out and presented through dashboard user interface 1170. In some embodiments, query processor 1130 may access persistence storage 1125 only once to obtain the initial state of every aggregation function f(x) in collection model 1 in a time window and navigate the predicates in expression tree 1140. Along the way, query processor 1130 can evaluate predicates in expression tree 1140 against metrics and metric values in tuples 1110 that were received within the specified time window and navigate expression tree 1140 through predicates evaluated to have a Boolean value of "true." Through this navigation, query processor 130 can determine a set of aggregation functions (f(x)'s) for collection model 1 (which is one of collection models 1150). Using the set of aggregation functions of collection model 1, the metrics and their values can be used to update view model(s) 1160 (1215). View model(s) 1160, in turn, can be communicated to dashboard user interface(s) 1170 for rendition and presentation of view(s) on user device(s) (1220).

Responsive to a user changing (e.g., by dragging and dropping) a value of a filter, all the internal computations of query processor 1130 will be managed at runtime on the fly. These computations can be time-sequence-based (using a time window) or for a snapshot in time. This is possible because what metadata a collection model is to aggregate can be user configurable—some entities in the collection model can be assigned (e.g., a component ID) and some entities are user-configurable (e.g., a metric).

A view model can specify what elements to display in a view, what layout for displaying the elements, and what action(s) to take responsive to a user interacting with an element in the view. For example, responsive to a user changing to a new time window (e.g., changing from "last hour" to "last 24 hours"), information displayed in a view can be dynamically "refreshed" or updated to reflect the new time window.

In some cases, while a view model can be fixed, the collection model used to aggregate metadata for the view model can be any aggregation function. In some cases, the view can be updated, or a new view generated, using the same view model. For example, responsive to a user selecting a filter (e.g., selecting a particular job group), information displayed in a view can be dynamically "refreshed" or updated using the same view model to reflect the filter selected by the user. Suppose the previous view shows individual jobs performed by a set of ecosystem components and the filter is applied to view the metrics of a job group performed by the set of ecosystem components in the same time window. In this case, query processor 1130 may leverage some computations already performed for the previous view. This means that query processor 1130 does not necessarily need to start from scratch each time a view request is received. Rather, time query processor 1130 can optimize its computation and avoid duplicating efforts by intelligently reusing, where appropriate, previously performed computations to expedite a response to the view request, asynchronous to other processing operations. Examples of such optimized, efficient asynchronous data processing operations of query processor 1130 are provided below.

As described above, there can be many ecosystem components in an ecosystem, each of which continuously publishes different types of data: activity information (e.g., how many documents a job has crawled, etc.) and lifecycle event information (e.g., job pending, running state, etc.). To provide a complete, timely, and accurate view of all types of information concerning these disparate ecosystem components, query processor 1130 is operable to perform computation on the fly, in real time, how many jobs have crawled, how many documents have been persisted in the last time window, etc., and calculate the next time period without duplicating any process.

FIGS. 13A-13E are flow diagrams illustrating examples of asynchronous data processing operations performed by a dashboard monitoring system according to some embodiments.

The dashboard monitoring system can provide a one-stop, end-to-end solution for monitoring a complex computing platform or ecosystem. At one end, disparate ecosystem components continually publishing real time metadata (metrics and events) to the dashboard monitoring system and, on the other end, view requests from dashboard user interface(s) can also be continuous. As discussed above, the dashboard monitoring system is operable to process the real time metadata and view requests asynchronously. View requests are continuous-natured queries and can be temporal-based and/or count-based.

Figure 13A:
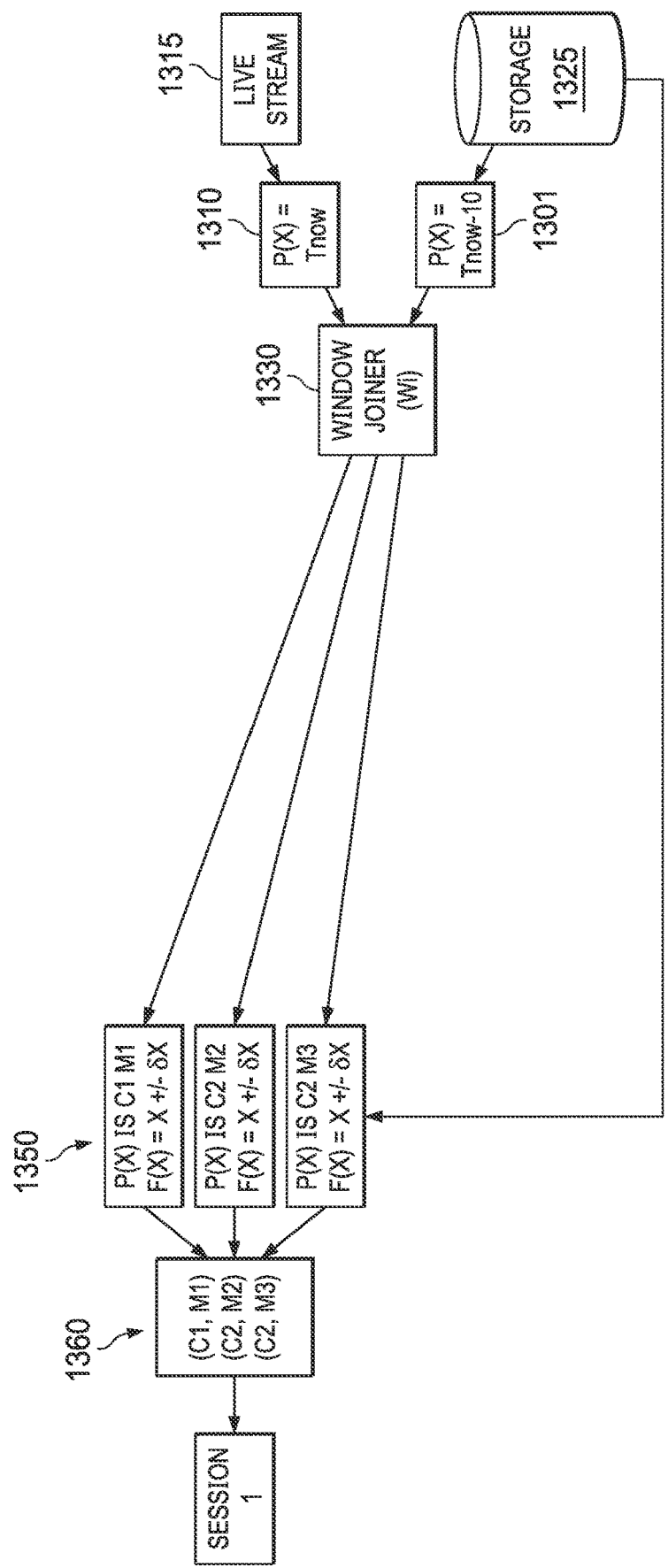
FIGS. 13A-13E are flow diagrams illustrating examples of asynchronous data processing operations performed by a dashboard monitoring system according to some embodiments.

To perform these asynchronous data processing operations, a query processor of the dashboard monitoring system can be configured with the ability to dynamically construct a Boolean expression tree and the ability to collect and perform computation (e.g., aggregation) as it navigates the Boolean express tree. FIG. 13A shows an example operation.

In this example, suppose a user of the dashboard monitoring system wants to know the total number of documents crawled, processed, and persisted per component in a set of ecosystem components during the last 10 minutes. To process this view request, the query processor forms a collection model in memory to aggregate the desired metadata needed to generate a view of the total number of documents crawled, processed, and persisted per component in a set of ecosystem components during the last 10 minutes. A view model for displaying this view may be predefined (e.g., for a default view showing the set of ecosystem components) or may be user-configured.

As this time window moves forward through time (for as long as the user's dashboard user interface is in the same socket session with the dashboard monitoring system), the query processor would need to first establish an initiate state and update values of the metadata of interest continuously as tuples continue to come from the set of ecosystem components.

When a collection model is formed the first time, the query processor can get an initiate state from an in-memory cache and a database, as shown in FIG. 10. Depending upon the size of the time window, the query processor could hold the initiate state in memory. However, the bigger the time window, the more memory could be needed. Thus, the query processor may obtain an initiate state from a persistent storage.

The initial state can be a snapshot in time. To construct an initial state of a metric pertaining to an ecosystem component (e.g., a document crawler) with regards to a time window, the query processor can extract metric values published by the ecosystem component in the past 10 minutes ("Tnow-10") and the current metric value ("Tnow") and join them to get a running total representing the initiate state of the ecosystem component. For example, at Tnow-10, 10 documents were crawled; at Tnow-9, 12 documents were crawled; at Tnow-8, 12 documents were crawled . . . and at Tnow, 9 documents were crawled. Suppose the total metric value is 120. The initiate state is that the document crawler has crawled 120 documents in the last 10 minutes.

As illustrated in FIG. 13A, the query processor can get an initial state of every function f(x) in a collection model from persistent storage 1325 only once and holds it in memory. The query processor determines predicate 1301 from the initial state and also determines, on the fly, predicate 1310 from live stream (of time-series tuples) 1315. The query processor can compute incrementally on arrival of new streams and can join two different streams and correlate multiple streams, out of sequence and late events. In the example of FIG. 13A, the joining function is performed by window joiner 1330. Each of predicate 1301, predicate 1310, and window joiner 1330 is a node of the Boolean expression tree.

While the size of the time window remains unchanged, the time window itself moves forward continuously. Suppose a new tuple arrives and has a metric value of 2. This metric value is added to the initial state and the oldest metric value is deducted from the initiate state. The current state for the document crawler becomes that it has crawled 112 documents in the last 10 minutes. This state computation can continuously be performed relative to a desired time window for each ecosystem component and each metric in a collection model.

The same initiate state can be copied and used for other collection model(s). All these computations (e.g., aggregation functions) take place in memory (e.g., in an in-memory cache) using the same Boolean expression tree so the query processor does not need to start the process again from scratch. The nodes in the Boolean express tree can start with a predicate and the query processor can navigate down the tree and perform computations.

In some cases, all the socket connections ("sessions") that request the same metadata will be routed through the same collection model. The Boolean expression tree can ensure that query operation is not duplicated to use the same collection model. This ensures effective memory management. A user can submit a query and the query processor can manage internally based on a combination of metadata of what the user wants to view. A view can show any combination of metadata published by an ecosystem component. Any filter (e.g., time-based, job-based, group-based, etc.) and/or grouping of views can be done through the collection model and all collection models can leverage the same Boolean expression tree to derive functions. As illustrated above, different views can be rendered and presented through dashboard user interface(s) without having to start each process from scratch.

In this case, computing predicates in the Boolean expression tree (with metric values extracted from the tuples) forms collection model 1350. In this case, collection model 1350 is formed fora combination of component 1, metric 1 (c1 m1); component 2, metric 2 (c2 m2); and component 2, metric 3 (c2 m3). This means that, after all predicate nodes are evaluated, the results of the collection are the three aggregation functions (f(x)'s) for c1 m1, c2 m2, and c2 m3. Here, "collection" refers to all the incoming streams that the dashboard monitoring system is aggregating in a time window based on the ecosystem component. Using the aggregation functions of collection model 1350, metric values for c1 m1, c2 m2, and c2 m3 are communicated to view model 1360 (which has an associated filter definition). In turn, view model 1360, is communicated to the user over a socket connection for session 1.

Figure 13B:
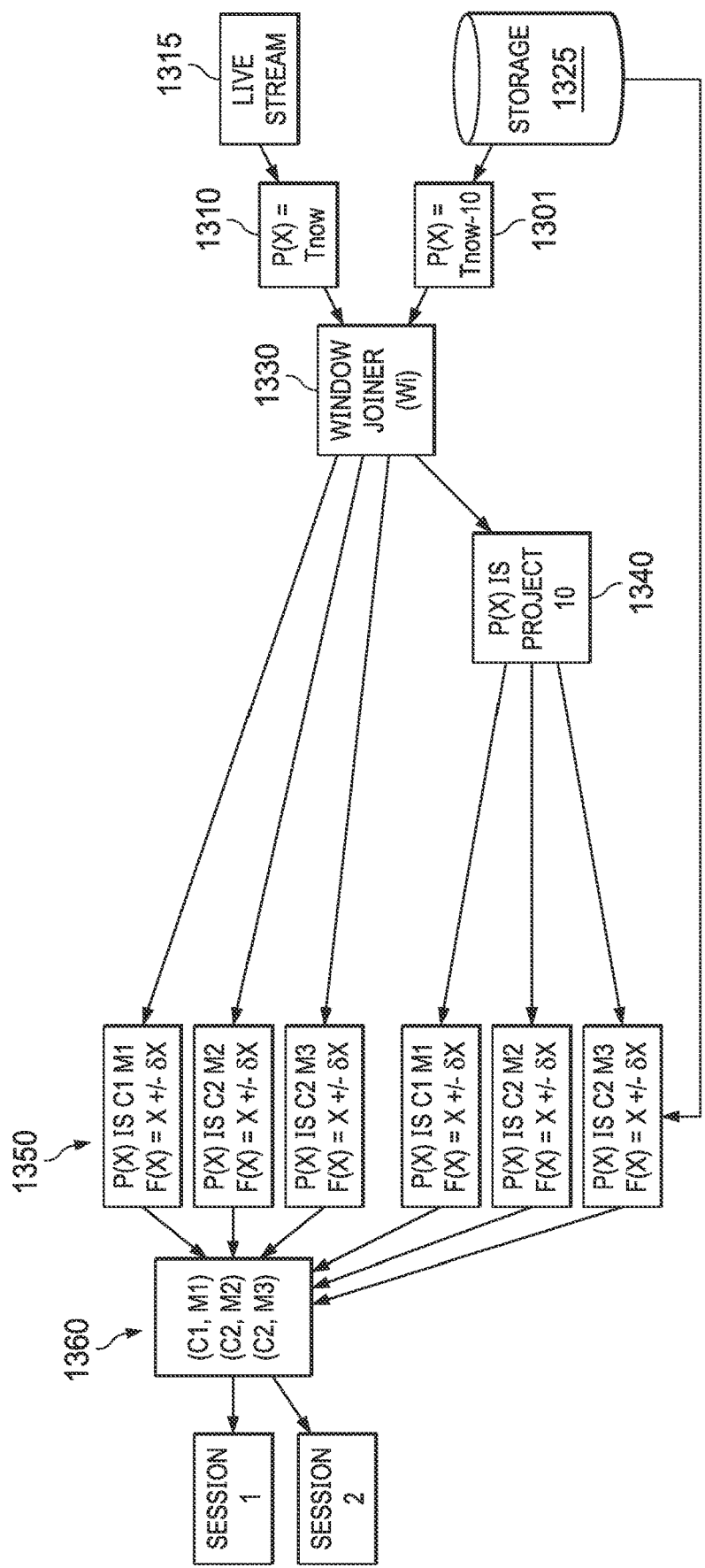

As illustrated in FIG. 13B, suppose the user opens a new window and requests to view "project 10." This establishes session 2. The query processor can derive a predicate ("P(x) is project 10"), represented by node 1340 in the Boolean expression tree, from this view request and direct a new stream from there without having to start from scratch to compute any initial state again. This is because session 2 can subscribe to every active stream running in the query processor and use all the computations that the query processor performs in memory. This allows the query processor to leverage computations already performed for session 1.

For example, since the initiate states of c1 m1, c2 m2, and c2 m3 have already been computed for session 1, the query processor does not compute them again. Instead, the query processor can reuse the computed initiate states, evaluate new predicate 1340 using the computed initiate states, and start a new stream from there.

In this example, evaluating new predicate 1340 leads to the same collection model 1350 which maps to the same view model 1360. Since session 1 has not been disconnected, view model 1360 is communicated to the user for both session 1 and session 2. Using view model 1360, a view of c1 m1, c2 m2, and c2 m3 can be rendered and shown in the dashboard user interface in session 1. Using the same view model 1360, a view of c1 m1, c2 m2, and c2 m3 is rendered and shown in the dashboard user interface in session 2 under project 10.

Figure 13C:
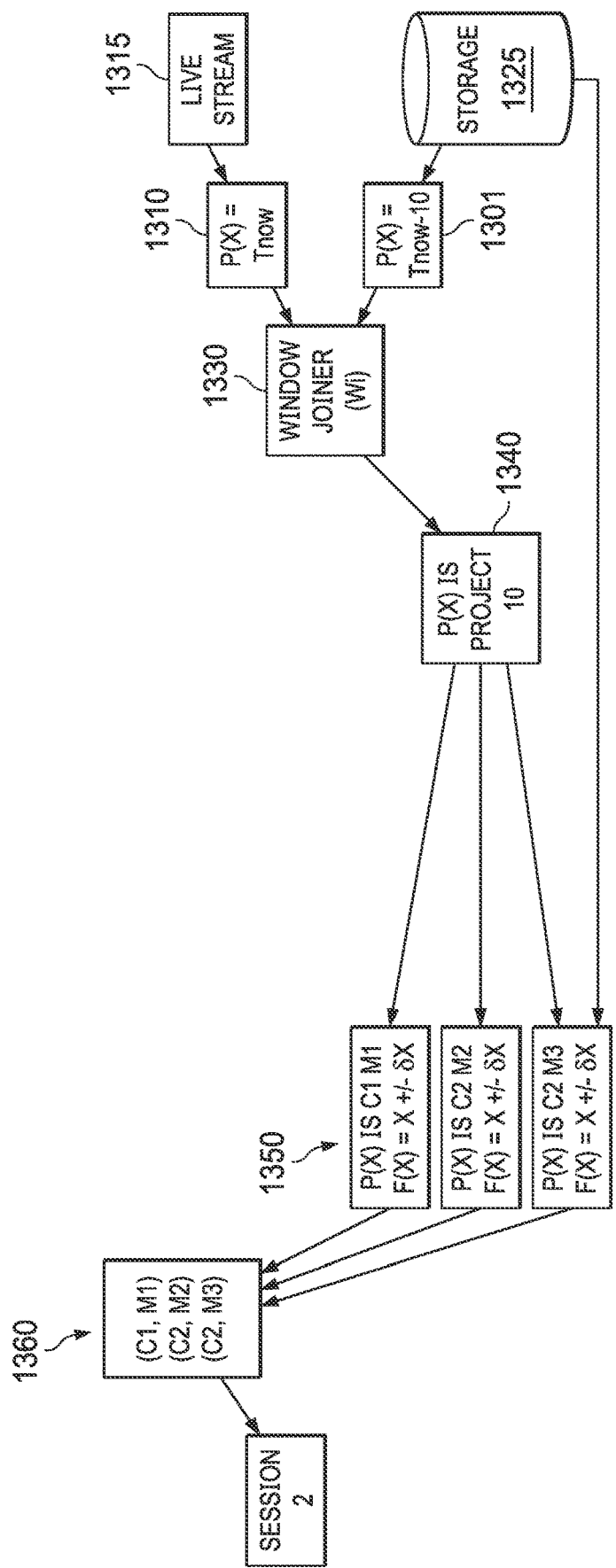

In the example of FIG. 13C, session 1 is disconnected (e.g., the user closed the browser window for session 1). In this case, the query processor does not automatically perform garbage collection to reclaim memory occupied by objects used in the now disconnected session 1. Rather, they are kept in memory and the query processor continues to monitor session 2. This is because the active stream in session 2 started from node 1330 in session 1 and session 2 is still connected. The query processor is operable to perform garbage collection only when a session is disconnected and none of the nodes is used by another active session (e.g., when a view in the session is stopped and there are no more session events).

Figure 13D:
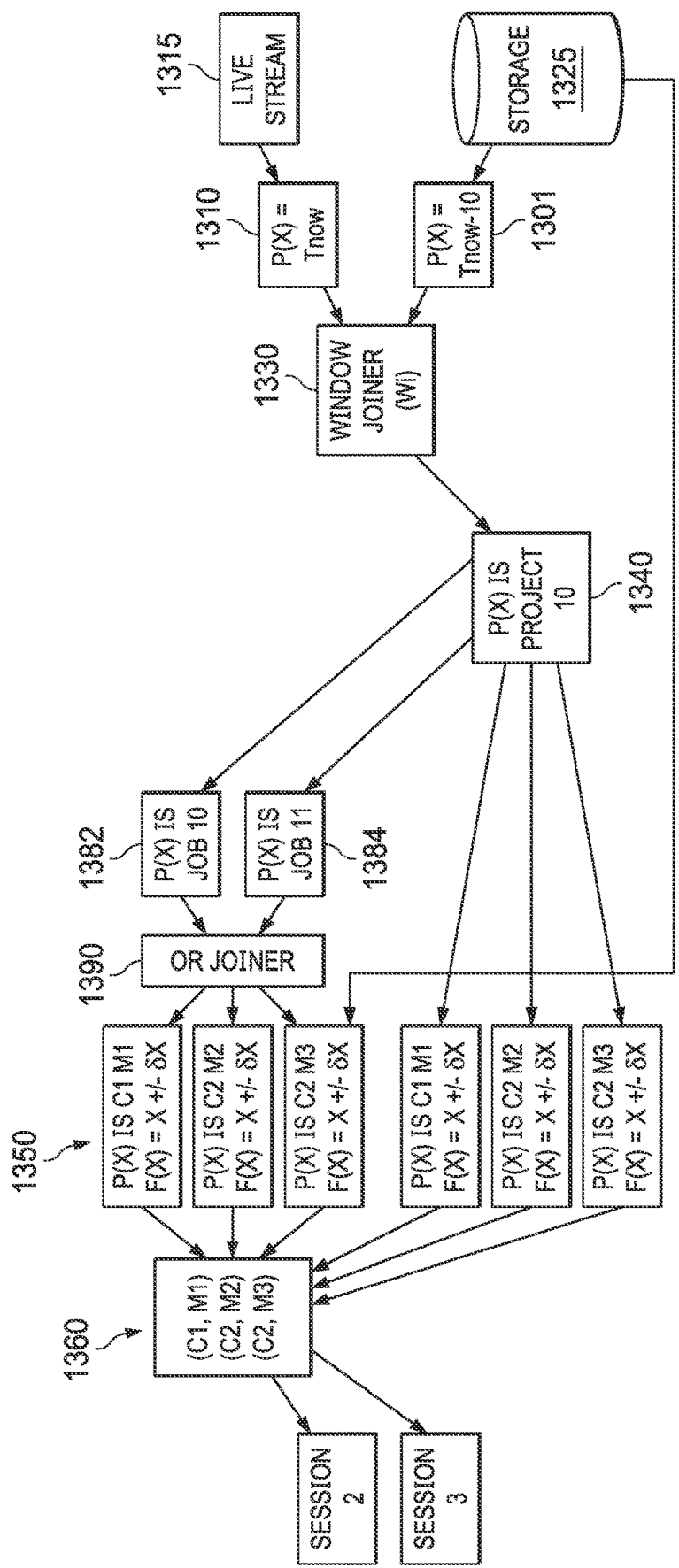

In FIG. 13D, another user connects to the dashboard monitoring system via session 3. In this case, the user is requesting to view job 10 and job 11 of project 10. The query processor does not need to start a new process to respond to this view request. This is possible because the query processor allows session 3 to subscribe to all the objects across the active stream platform on which the query processor runs. Since the same project was requested in session 2, all the computations done in session 2 for this project can be reused. Accordingly, the query processor connects session 3 to the project (node 1340) and directs the stream from node 1340 to nodes 1382, 1384 representing job 10 and job 11 and connects (e.g., via an OR function 1390) the two active streams from nodes 1382, 1384 to collection model 1350. Since the metadata of interest indicated by this view request are the same as those in session 2, they are "routed" to the same collection model 1350 which has a set of aggregation functions for aggregating metric values for c1 m1, c2 m2, and c2 m3. Collection model 1350 is mapped to the same view model 1360. However, the filter definition for view model 1360 is updated to include a combination of filters for job 10, job 11, and project 10. View model 1360 (with the updated filter definition) is communicated to the dashboard user interface for dynamic rendition and presentation of the view in session 3.

Figure 13E:
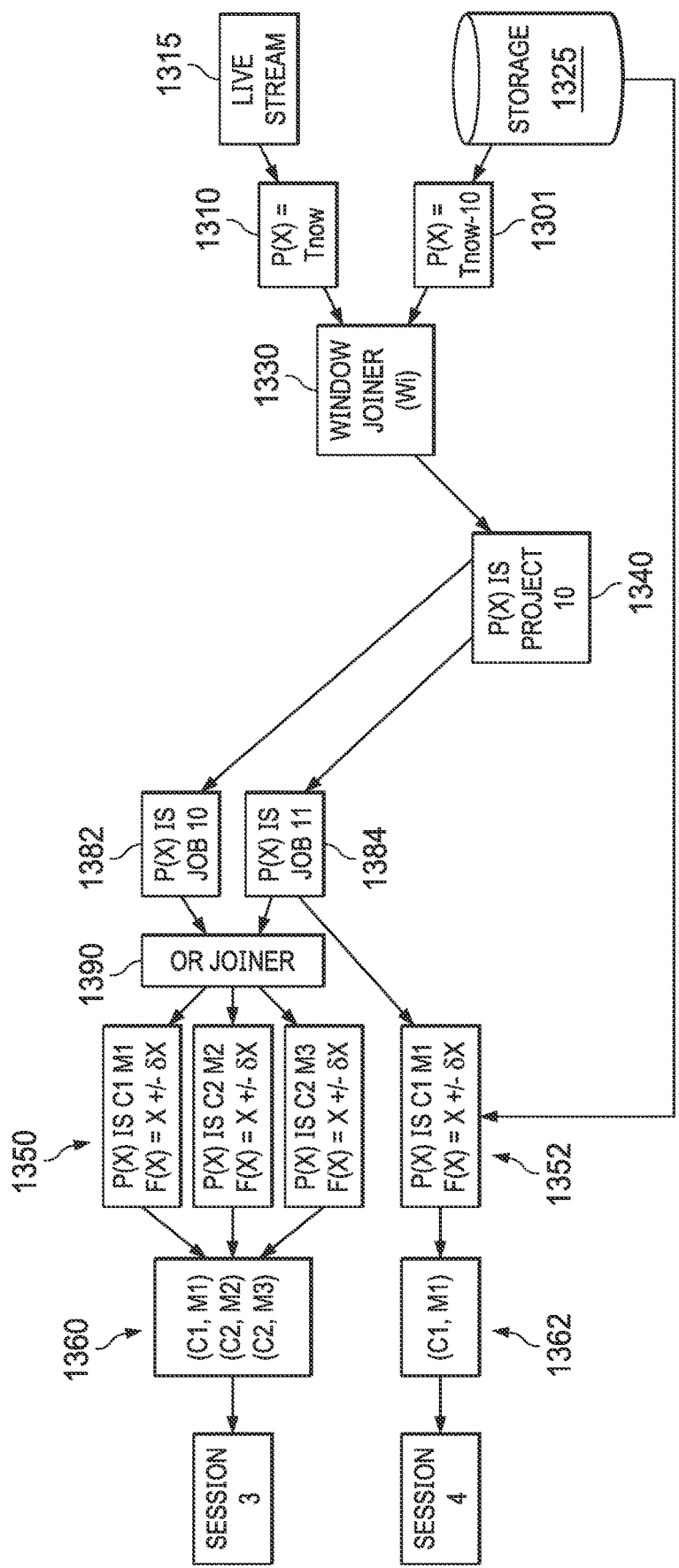

The query process is now watching session 2 and session 3, both of which are using node 1340. Suppose that session 2 is disconnected and another user connects to the dashboard monitoring system via session 4. As shown in FIG. 13E, the session 4 user wants a different view model 1362 for component 1, metric 1, and job 11. The query processor can reuse computations done in session 3 and start a new active stream from node 1344 to form collection model 1352 for aggregating metadata relating to c1 m1 for view model 1362. In this case, view model 1362 has an associated filter definition that specifies job 11, project 10.

Nodes 1382, 1384 are representative of nodes in the Boolean expression tree that can serve as stream diverters. As the query processor processes each live stream, when a view request necessitates a new node, the query processor can create a new stream for that node and not have to start from the beginning. That is, the query processor can connect the stream to the right node to get the stream data from an existing predicate (e.g., node 1340 for project 10).

As illustrated above, a dashboard monitoring system disclosed herein can process continuous real time data streams from disparate ecosystem components in an ecosystem. Asynchronously to this real time processing, the dashboard monitoring system can simultaneously process multiple view requests and update views displayed on multiple dashboard user interfaces to continuously reflect real time job activities and health statuses of all the ecosystem components in the ecosystem with respect to changing time windows in an efficient and comprehensive manner with optimized speed and memory management.

Figure 14:
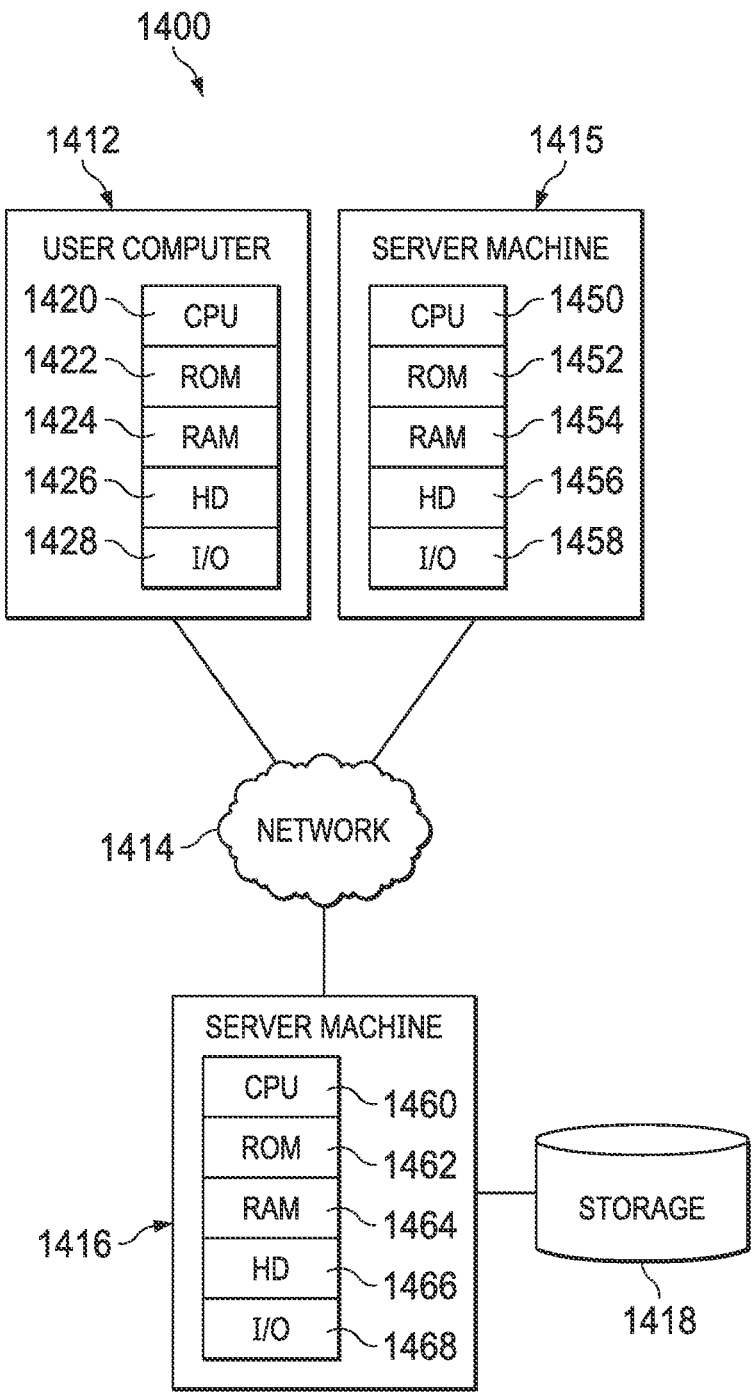
FIG. 14 depicts a diagrammatic representation of an example of networked data processing systems implementing an ecosystem, a dashboard monitoring system configured for monitoring the ecosystem, and dashboard user interfaces configured for continuously and dynamically presenting activity and health information of the entire ecosystem that is monitored by the dashboard monitoring system.

FIG. 14 depicts a diagrammatic representation of an example of networked data processing systems implementing an ecosystem, a dashboard monitoring system configured for monitoring the ecosystem, and dashboard user interfaces configured for continuously and dynamically presenting activity and health information of the entire ecosystem that is monitored by the dashboard monitoring system. In the example illustrated, network computing environment 1400 includes network 1414 that can be bi-directionally coupled to user computer 1412, server machine 1415, and server machine 1416. Server machine can be bi-directionally coupled to persistent storage 1418. Network 1414 may represent a combination of wired and wireless networks that network computing environment 1400 may utilize for various types of network communications known to those skilled in the art.

For the purpose of illustration, a single system is shown for each of user computer 1412, server machine 1415, and server machine 1416. However, with each of user computer 1412, server machine 1415, and server machine 1416, a plurality of computers (not shown) may be interconnected to each other over network 1414. For example, a plurality of user computers 1412 and a plurality of server machines 1415 may be coupled to network 1414. User computer 1412 may include data processing systems for communicating with server machine 1416. As a non-limiting example, a dashboard user interface may run on user computer 1412 and be communicatively connected to a dashboard monitoring system running on server machine 1416. Server machine 1416 may represent a node in an ecosystem. An ecosystem component running on server machine 1416 may be configured for publishing or providing real time activity and event information to the dashboard monitoring system running on server machine 1416 as described above.

User computer 1412 can include central processing unit ("CPU") 1420, read-only memory ("ROM") 1422, random access memory ("RAM") 1424, hard drive ("HD") or storage memory 1426, and input/output device(s) ("I/O") 1428. I/O 1429 can include a keyboard, monitor, printer, electronic pointing device (e.g., mouse, trackball, stylus, touch interface, etc.), or the like. User computer 1412 can include a desktop computer, a laptop computer, a personal digital assistant, a cellular or smart phone, or nearly any device capable of communicating over a network. Server machine 1416 may be similar to user computer 1412 and can comprise CPU 1460, ROM 1462, RAM 1464, HD 1466, and I/O 1468. Likewise, server machine 1415 may include CPU 1450, ROM 1452, RAM 1454, HD 1456, and I/O 1458. Many other alternative configurations are possible and known to skilled artisans.

Each of the computers in FIG. 14 may have more than one CPU, ROM, RAM, HD, I/O, or other hardware components. For the sake of brevity, each computer is illustrated as having one of each of the hardware components, even if more than one is used. Each of computers 1412, 1415, and 1416 is an example of a data processing system. ROM 1422, 1452, and 1462; RAM 1424, 1454, and 1464; HD 1426, 1456, and 1466; and database 1418 can include media that can be read by CPU 1420, 1450, or 1460. Therefore, these types of memories include non-transitory computer-readable storage media. These memories may be internal or external to computers 1412, 1415, or 1416.

Portions of the methods described herein may be implemented in suitable software code that may reside within ROM 1422, 1452, or 1462; RAM 1424, 1454, or 1464; or HD 1426, 1456, or 1466. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A system, comprising: a processor; and a non-transitory computer-readable medium storing instructions translatable by the processor to perform:
configuring an ecosystem component with a dashboard notifier library, the dashboard notifier library including an in-memory data structure local to the dashboard notifier library, wherein the dashboard notifier library is configured for asynchronous processing of metrics and events generated by the ecosystem component, the ecosystem component running on a server machine in an enterprise computing environment;
starting up the ecosystem component configured with the dashboard notifier library, wherein the starting up comprises starting up a dashboard notifier embedded in the ecosystem component, wherein the dashboard notifier registers the ecosystem component with a dashboard monitoring system over a network, the dashboard monitoring system operating in the enterprise computing environment and configured for monitoring an ecosystem having disparate ecosystem components, the disparate ecosystem components comprising:
the ecosystem component, and
the dashboard monitoring system having a data receiver;
placing, by the dashboard notifier, elements generated during operation of the ecosystem component in the in-memory data structure local to the dashboard notifier library, the elements from the ecosystem component including real-time metrics comprising:
a specific measure of one or more job activities performed by the ecosystem component; and
an event occurring at the ecosystem component;
wherein the specific measure of the one or more job activities includes one or more of a specific measure of a crawling activity, a specific measure of a data ingestion activity, and a specific measure of a content enrichment activity;
reading, asynchronously by the dashboard notifier, a batch of the generated metric and event elements from the in-memory data structure local to the dashboard notifier library; and
pushing or publishing, by the dashboard notifier, the batch of elements read from the in-memory data structure local to the dashboard notifier library to the data receiver of the dashboard monitoring system.

2. The system according to claim 1, wherein the elements from the ecosystem component comprise a measure of a crawling, data ingestion, or content enrichment activity by the ecosystem component or a lifecycle event reported by the ecosystem component.

3. The system according to claim 1, wherein the pushing or publishing further comprises pushing or publishing, by a transporter of the dashboard notifier, the batch of elements to a dashboard agent running on the server machine and pushing or publishing, by the dashboard agent, the batch of elements to the dashboard monitoring system.

4. The system according to claim 3, wherein the transporter is configured for making an application programming interface call to the dashboard monitoring system or for pushing or publishing the batch of elements to a distributed streaming platform.

5. The system according to claim 1, further comprising instantiating two separate worker threads for performing a data collection task and a data transportation task such that the placing is not affected by the reading.

6. The system according to claim 1, further comprising:
determining, by the dashboard notifier, whether the dashboard monitoring system is offline or not available; and
responsive to a determination by the dashboard notifier that the dashboard monitoring system is offline or not available, placing a worker thread for the reading in a waiting mode.

7. A method, comprising:
configuring an ecosystem component with a dashboard notifier library, the dashboard notifier library including an in-memory data structure local to the dashboard notifier library, wherein the dashboard notifier library is configured for asynchronous processing of metrics and events generated by the ecosystem component, the ecosystem component running on a server machine in an enterprise computing environment;

starting up the ecosystem component configured with the dashboard notifier library, wherein the starting up comprises starting up a dashboard notifier embedded in the ecosystem component, wherein the dashboard notifier registers the ecosystem component with a dashboard monitoring system over a network, the dashboard monitoring system operating in the enterprise computing environment and configured for monitoring an ecosystem having disparate ecosystem components, the disparate ecosystem components comprising:
  the ecosystem component, and
  the dashboard monitoring system having a data receiver;
placing, by the dashboard notifier, elements generated during operation of the ecosystem component in the in-memory data structure local to the dashboard notifier library, the elements from the ecosystem component including real-time metrics comprising:
  a specific measure of one or more job activities performed by the ecosystem component; and
  an event occurring at the ecosystem component;
  wherein the specific measure of the one or more job activities includes one or more of a specific measure of a crawling activity, a specific measure of a data ingestion activity, and a specific measure of a content enrichment activity;
reading, asynchronously by the dashboard notifier, a batch of the generated metric and event elements from the in-memory data structure local to the dashboard notifier library; and
pushing or publishing, by the dashboard notifier, the batch of elements read from the in-memory data structure local to the dashboard notifier library to the data receiver of the dashboard monitoring system.

8. The method according to claim 7, wherein the elements from the ecosystem component comprise a measure of a crawling, data ingestion, or content enrichment activity by the ecosystem component or a lifecycle event reported by the ecosystem component.

9. The method according to claim 7, wherein the pushing or publishing further comprises pushing or publishing, by a transporter of the dashboard notifier, the batch of elements to a dashboard agent running on the server machine and pushing or publishing, by the dashboard agent, the batch of elements to the dashboard monitoring system.

10. The method according to claim 9, wherein the transporter is configured for making an application programming interface call to the dashboard monitoring system or for pushing or publishing the batch of elements to a distributed streaming platform.

11. The method according to claim 7, further comprising instantiating two separate worker threads for performing a data collection task and a data transportation task such that the placing is not affected by the reading.

12. The method according to claim 7, further comprising:
  determining, by the dashboard notifier, whether the dashboard monitoring system is offline or not available; and
  responsive to a determination by the dashboard notifier that the dashboard monitoring system is offline or not available, placing a worker thread for the reading in a waiting mode.

13. A method, comprising:
  continuously receiving, by a query processor of a dashboard monitoring system running on a server machine operating in an enterprise computing environment, input streams of tuples pushed or published by embedded dashboard notifiers from respective local in-memory data structures within disparate ecosystem components of an ecosystem, wherein each embedded dashboard notifier asynchronously reads batches of tuples from its respective in-memory data structure, each tuple comprising metadata that can be utilized for view and for function, including a timestamp, a metric or event name, a metric or event value, and an identifier for an ecosystem component of the ecosystem, the dashboard monitoring system configured for monitoring the ecosystem having the disparate ecosystem components, wherein the metric or event name and metric or event value correspond to one or more of a specific measure of crawling activity, a specific measure of data ingestion activity, or a specific measure of content enrichment activity that is monitored by the dashboard monitoring system;
  dynamically constructing, by the query processor, an expression tree in memory, the expression tree having nodes representing predicates;
  navigating, by the query processor, the nodes of the expression tree to form a set of aggregation functions for a collection model in the dashboard monitoring system;
  receiving, by the query processor, a view request from a user device through a user interface requesting a view for a set of metrics, the view request indicating a time window;
  determining, by the query processor, an initiate state of the set of metrics in the time window;
  filtering, by the query processor utilizing the expression tree, the input streams of tuples received from the embedded dashboard notifiers with respect to the time window, the filtering further comprising
directing metadata in the tuples into the collection model in the dashboard monitoring system, the collection model corresponding to a view model for the view;
  updating the view model based on the metadata in the tuples utilizing the collection model in the dashboard monitoring system; and
  communicating the view model to the user device for rendition and presentation of the view through the user interface.

14. The method according to claim 13, wherein each tuple comprises a component identifier, a group or project identifier, a job identifier, a metric or event name, a metric or event value, and a timestamp.

15. The method according to claim 13, wherein the filtering further comprises:
  determining a new predicate from the view request;
  adding a node to the expression tree, the node representing the new predicate;
  creating a new stream from the node in the expression tree; and
  connecting the new stream to the collection model.

16. The method according to claim 13, further comprising:
  obtaining, by the query processor from a persistent storage, the initial state;
  extracting a value from the initial state;
  determining a total value for the time window utilizing the value from the initial state;
  on arrival of a new tuple, updating the total value by adding a metric or event value from the new tuple and removing the value from the initial state, the updating reflecting the total value at a current time of the time window; and on arrival of each subsequent tuple, incrementally updating the total value.

17. The method according to claim 13, wherein the tuple comprises a JavaScript Object Notation string.

18. The method according to claim 13, further comprising receiving the metrics of crawling, data ingestion, and content enrichment activities and health information pushed from dashboard notifiers running in the disparate ecosystem components of the ecosystem or a portion thereof.

19. The method according to claim 13, further comprising polling the metrics of crawling, data ingestion, and content enrichment activities and health information through dashboard agents communicatively connected to the disparate ecosystem components of the ecosystem or a portion thereof.

* * * * *